(12) United States Patent
Keating et al.

(10) Patent No.: US 11,220,237 B2
(45) Date of Patent: Jan. 11, 2022

(54) SYSTEMS AND METHODS FOR REGULATING VEHICLE ACCESS

(71) Applicant: Scoot Rides, Inc., Santa Monica, CA (US)

(72) Inventors: Michael Keating, San Francisco, CA (US); J. Loren Passmore, San Francisco, CA (US); Peter R. Russo, San Francisco, CA (US)

(73) Assignee: Scoot Rides, Inc., Santa Monica, CA (US)

( * ) Notice: Subject to any disclaimer, the term of this patent is extended or adjusted under 35 U.S.C. 154(b) by 0 days.

(21) Appl. No.: 16/557,687

(22) Filed: Aug. 30, 2019

(65) Prior Publication Data

US 2020/0055486 A1 Feb. 20, 2020

Related U.S. Application Data

(63) Continuation of application No. 15/976,303, filed on May 10, 2018, now Pat. No. 10,434,985, which is a (Continued)

(51) Int. Cl.
*B60R 25/00* (2013.01)
*B60R 25/20* (2013.01)
(Continued)

(52) U.S. Cl.
CPC .............. *B60R 25/20* (2013.01); *B60R 25/33* (2013.01); *G06Q 50/30* (2013.01); *G07C 9/29* (2020.01);
(Continued)

(58) Field of Classification Search
None
See application file for complete search history.

(56) References Cited

U.S. PATENT DOCUMENTS 6,378,815 B1 * 4/2002 Lee .......................... B62J 7/06
224/420
6,472,771 B1 10/2002 Frese
(Continued)

FOREIGN PATENT DOCUMENTS

CN 102013137 4/2011
CN 204706096 10/2015
(Continued)

OTHER PUBLICATIONS

European Search Report and Opinion dated Jun. 1, 2016 for EP Application No. 13842184.
(Continued)

*Primary Examiner* — Jonathan M Dager
(74) *Attorney, Agent, or Firm* — Van Pelt, Yi & James LLP

(57) ABSTRACT

A request to access a vehicle is received from an electronic device of a user. The vehicle can be disposed at a designated geographic location. Next, geographic information of the user is received from the electronic device. The geographic information is determined with the aid of the electronic device of the user. The user is then provided access to the vehicle if, based on the received geographic information, a geographic location of the user is within a given distance from the designated geographic location of the vehicle.

25 Claims, 34 Drawing Sheets

Related U.S. Application Data continuation of application No. 15/653,275, filed on Jul. 18, 2017, now Pat. No. 10,086,796, which is a continuation of application No. 15/411,916, filed on Jan. 20, 2017, now Pat. No. 9,738,255, which is a continuation of application No. 14/668,781, filed on Mar. 25, 2015, now Pat. No. 9,586,559, which is a continuation of application No. PCT/US2013/061465, filed on Sep. 24, 2013.

(60) Provisional application No. 61/705,594, filed on Sep. 25, 2012.

(51) Int. Cl.
| | |
|---|---|
| *H04W 4/44* | (2018.01) |
| *G06Q 50/30* | (2012.01) |
| *G08G 1/005* | (2006.01) |
| *G08G 1/00* | (2006.01) |
| *G07C 9/29* | (2020.01) |
| *G07C 9/30* | (2020.01) |
| *H04M 1/72448* | (2021.01) |
| *B60R 25/33* | (2013.01) |
| *H04B 1/3877* | (2015.01) |
| *H04W 4/02* | (2018.01) |
| *H04W 4/40* | (2018.01) |

(52) U.S. Cl.
CPC .............. *G07C 9/30* (2020.01); *G08G 1/005* (2013.01); *G08G 1/205* (2013.01); *H04B 1/3877* (2013.01); *H04M 1/72448* (2021.01); *H04W 4/023* (2013.01); *H04W 4/40* (2018.02); *H04W 4/44* (2018.02)

(56) References Cited

U.S. PATENT DOCUMENTS

| | | | | |
|---|---|---|---|---|
| 6,850,898 | B1* | 2/2005 | Murakami | B60L 53/305 705/13 |
| 6,941,197 | B1* | 9/2005 | Murakami | B60L 53/305 701/22 |
| 6,947,881 | B1* | 9/2005 | Murakami | G07C 9/0069 703/8 |
| 8,627,990 | B2* | 1/2014 | Nakajima | B62J 11/00 224/420 |
| 8,635,091 | B2* | 1/2014 | Amigo | G07C 5/008 705/4 |
| 8,662,528 | B1 | 3/2014 | Abdulaziz | |
| 8,727,192 | B2* | 5/2014 | Lai | F16M 13/022 224/420 |
| 8,738,212 | B1 | 5/2014 | Schieffelin | |
| 8,849,237 | B2* | 9/2014 | Bourdu | G08G 1/0967 455/404.1 |
| 8,918,231 | B2* | 12/2014 | Rovik | B60R 25/01 701/2 |
| 8,983,704 | B2 | 3/2015 | Schieffelin | |
| 8,998,048 | B1* | 4/2015 | Wu | F16M 13/00 224/420 |
| 9,045,102 | B2* | 6/2015 | Caratto | B60R 25/00 |
| 9,168,975 | B1 | 10/2015 | Schieffelin | |
| 9,171,268 | B1* | 10/2015 | Penilla | B60L 53/305 |
| 9,189,900 | B1* | 11/2015 | Penilla | H04L 9/14 |
| 9,194,168 | B1* | 11/2015 | Lu | B60R 25/24 |
| 9,229,623 | B1* | 1/2016 | Penilla | B60L 50/66 |
| 9,288,270 | B1* | 3/2016 | Penilla | G06Q 10/02 |
| 9,415,833 | B2 | 8/2016 | Schieffelin | |
| 9,569,966 | B2* | 2/2017 | Bobbitt | G08G 1/20 |
| 9,586,559 | B2 | 3/2017 | Keating | |
| 9,586,599 | B2 | 3/2017 | Filev | |
| 9,656,672 | B2 | 5/2017 | Schieffelin | |
| 9,738,255 | B2 | 8/2017 | Keating | |
| 10,023,266 | B2 | 7/2018 | Contello | |
| 10,086,796 | B2 | 10/2018 | Keating | |
| 10,109,006 | B2 | 10/2018 | Yan | |
| 10,262,484 | B2* | 4/2019 | Conrad | G07C 9/00309 |
| 10,358,133 | B2 | 7/2019 | Schieffelin | |
| 10,434,985 | B2 | 10/2019 | Keating | |
| 10,607,492 | B2 | 3/2020 | Vanderzanden | |
| 10,974,782 | B2 | 4/2021 | Foley | |
| 11,100,346 | B2 | 8/2021 | Beaurepaire | |
| 2002/0174077 | A1* | 11/2002 | Yui | G07F 17/0014 705/400 |
| 2002/0186144 | A1* | 12/2002 | Meunier | G07B 15/00 340/4.6 |
| 2003/0078707 | A1 | 4/2003 | Shioda | |
| 2004/0012261 | A1* | 1/2004 | Albert | G07C 9/00309 307/10.2 |
| 2004/0075541 | A1* | 4/2004 | Simoneau | B60R 25/102 340/426.11 |
| 2004/0108348 | A1* | 6/2004 | Barnes | B62J 11/00 224/413 |
| 2004/0119610 | A1 | 6/2004 | Maemura | |
| 2006/0108167 | A1* | 5/2006 | Finger | B60R 22/48 180/268 |
| 2007/0045495 | A1* | 3/2007 | Asano | H04M 1/04 248/309.1 |
| 2007/0168104 | A1* | 7/2007 | Nelson | G08G 1/207 701/93 |
| 2007/0285209 | A1 | 12/2007 | Heusi | |
| 2008/0179478 | A1* | 7/2008 | Lee | B60R 11/02 248/276.1 |
| 2008/0201160 | A1 | 8/2008 | Chang | |
| 2009/0052071 | A1* | 2/2009 | Chang | B60R 1/12 359/839 |
| 2010/0075656 | A1* | 3/2010 | Howarter | B60R 25/2009 455/420 |
| 2010/0089846 | A1* | 4/2010 | Navarro Ruiz | B62M 6/40 211/4 |
| 2010/0228405 | A1* | 9/2010 | Morgal | B60L 53/68 701/2 |
| 2011/0054735 | A1* | 3/2011 | Kamiya | G07C 9/00309 701/36 |
| 2011/0060480 | A1* | 3/2011 | Mottla | G01C 21/3608 701/2 |
| 2011/0112969 | A1* | 5/2011 | Zaid | G06Q 50/30 705/50 |
| 2011/0184789 | A1* | 7/2011 | Kirsch | H04W 4/029 705/14.1 |
| 2011/0213629 | A1* | 9/2011 | Clark | G06Q 10/02 705/5 |
| 2012/0000720 | A1* | 1/2012 | Honda | B62K 11/10 180/65.1 |
| 2012/0286950 | A1* | 11/2012 | Peariso | G08B 13/1427 340/539.1 |
| 2012/0330696 | A1 | 12/2012 | Clark | |
| 2013/0030581 | A1* | 1/2013 | Luke | B60L 58/10 700/286 |
| 2013/0030696 | A1* | 1/2013 | Wu | G06Q 30/0261 701/431 |
| 2013/0093585 | A1* | 4/2013 | Ambani | A42B 3/306 340/475 |
| 2013/0099892 | A1* | 4/2013 | Tucker | H04W 4/80 340/5.61 |
| 2013/0116892 | A1* | 5/2013 | Wu | B60R 25/09 701/45 |
| 2013/0134196 | A1* | 5/2013 | Lee | F16M 11/08 224/448 |
| 2013/0144482 | A1* | 6/2013 | Tuukkanen | B60R 1/00 701/29.6 |
| 2013/0164572 | A1* | 6/2013 | Liao | H01M 10/4221 429/50 |
| 2013/0238167 | A1* | 9/2013 | Stanfield | B60Q 1/2696 701/2 |
| 2013/0317693 | A1* | 11/2013 | Jefferies | G07C 5/008 701/31.5 |
| 2013/0321178 | A1* | 12/2013 | Jameel | H04W 4/029 340/989 |

(56) References Cited

U.S. PATENT DOCUMENTS

| | | | |
|---|---|---|---|
| 2013/0325521 A1* | 12/2013 | Jameel | G06Q 10/02 705/5 |
| 2014/0163774 A1* | 6/2014 | Demeniuk | H04L 67/12 701/2 |
| 2014/0163797 A1 | 6/2014 | Schieffelin | |
| 2014/0172192 A1* | 6/2014 | Kato | G06F 17/00 701/2 |
| 2014/0172727 A1* | 6/2014 | Abhyanker | G06Q 30/0645 705/307 |
| 2014/0188310 A1 | 7/2014 | Hatfield | |
| 2014/0200742 A1* | 7/2014 | Mauti, Jr. | F02D 29/02 701/2 |
| 2014/0218533 A1 | 8/2014 | Nerayoff et al. | |
| 2014/0222298 A1* | 8/2014 | Gurin | B60R 25/305 701/49 |
| 2014/0343773 A1 | 11/2014 | Schieffelin | |
| 2015/0046022 A1* | 2/2015 | Bai | G07C 5/008 701/31.5 |
| 2015/0291253 A1 | 10/2015 | Schieffelin | |
| 2015/0339595 A1* | 11/2015 | Soutter | G06Q 30/0207 705/5 |
| 2015/0339923 A1* | 11/2015 | Konig | H04L 67/12 701/522 |
| 2015/0370253 A1* | 12/2015 | Gurin | H04N 7/185 701/23 |
| 2016/0027307 A1* | 1/2016 | Abhyanker | G06Q 50/01 701/117 |
| 2016/0048777 A1* | 2/2016 | Kitagawa | G06Q 10/025 705/6 |
| 2016/0176472 A1 | 6/2016 | Schieffelin | |
| 2016/0180721 A1* | 6/2016 | Otulic | B60Q 9/00 701/2 |
| 2016/0311334 A1* | 10/2016 | Moravick | B60L 58/12 |
| 2017/0004712 A1 | 1/2017 | Yang | |
| 2017/0008451 A1 | 1/2017 | Stanfield et al. | |
| 2017/0039631 A1* | 2/2017 | Luke | G06Q 30/0645 |
| 2017/0039668 A1* | 2/2017 | Luke | G06Q 10/06 |
| 2017/0061709 A1* | 3/2017 | Toya | G07C 5/008 |
| 2017/0106866 A1 | 4/2017 | Schieffelin | |
| 2017/0282919 A1 | 10/2017 | Schieffelin | |
| 2017/0364995 A1 | 12/2017 | Yan | |
| 2018/0009414 A1 | 1/2018 | Keating | |
| 2018/0056791 A1 | 3/2018 | Lee | |
| 2018/0238698 A1 | 8/2018 | Pedersen | |
| 2019/0102858 A1 | 4/2019 | Pivnick | |
| 2019/0248439 A1 | 8/2019 | Wang | |
| 2019/0311630 A1 | 10/2019 | Vanderzanden | |
| 2019/0318419 A1 | 10/2019 | Vanderzanden | |
| 2019/0324446 A1 | 10/2019 | Vanderzanden | |
| 2020/0058065 A1 | 2/2020 | Vanderzanden | |
| 2020/0124430 A1 | 4/2020 | Bradlow | |
| 2020/0180718 A1 | 6/2020 | Foley | |
| 2020/0180719 A1 | 6/2020 | Chadwick | |
| 2020/0210729 A1 | 7/2020 | Beaurepaire | |
| 2020/0250975 A1 | 8/2020 | Tang | |
| 2020/0258393 A1 | 8/2020 | Vanderzanden | |
| 2020/0356107 A1 | 11/2020 | Wells | |
| 2021/0023952 A1 | 1/2021 | Sussna | |
| 2021/0035032 A1 | 2/2021 | Foley | |
| 2021/0116581 A1 | 4/2021 | Cooper | |
| 2021/0125499 A1 | 4/2021 | Cooper | |
| 2021/0247196 A1 | 8/2021 | Wells | |

FOREIGN PATENT DOCUMENTS

| | | |
|---|---|---|
| CN | 102667655 | 10/2016 |
| CN | 206737501 | 12/2017 |
| EP | 1271418 | 1/2003 |
| FR | 2801994 | 1/2002 |
| JP | 2000337917 | 12/2000 |
| JP | 2003058989 | 2/2003 |
| JP | 2004312376 | 11/2004 |
| JP | 2005163522 | 6/2005 |
| JP | 2005277632 | 10/2005 |
| JP | 2007331725 | 12/2007 |
| JP | 2008189261 | 8/2008 |
| JP | 2011154420 | 8/2011 |
| JP | 2011228841 | 11/2011 |
| KR | 20070017860 | 2/2007 |
| WO | 0161604 | 8/2001 |
| WO | 2014052329 | 4/2014 |
| WO | 2017217936 | 12/2017 |

OTHER PUBLICATIONS

Examination Report No. 1 for AU Application No. 2013323782 dated Oct. 12, 2018.

International Preliminary Report on Patentability and Written Opinion dated Feb. 3, 2014 for PCT Application No. US2013/061465.

International Search Report and Written Opinion dated Feb. 3, 2014 for PCT Application No. US2013/061465.

Notice of Allowance dated Apr. 18, 2017 for U.S. Appl. No. 15/411,916.

Notice of Allowance dated Oct. 24, 2016 for U.S. Appl. No. 14/668,781.

Office Action dated Apr. 1, 2016 for U.S. Appl. No. 14/668,781.

Office Action dated Aug. 31, 2016 for U.S. Appl. No. 14/668,781.

Scoot Networks (Demo Pit)—Launch Festival 2012 Presentation. LaunchConf. Scoot Networks. Published Mar. 14, 2012. https://www.youtube.com/watch?v=p5BlyBeTgzE.

U.S. Appl. No. 15/653,275 Notice of Allowance dated May 18, 2018.

U.S. Appl. No. 15/653,275 Office Action dated Jan. 12, 2018.

YouTube video titled Electric Scooter Sharing Service Makes Its Way to DC, available at https://www.youtube.com/watch?v=Kyoo8afD5hE, published on Mar. 1, 2018.

* cited by examiner

| Pin | Signal | | Signal | Pin |
|---|---|---|---|---|
| | | | TMA/RA0 | 17 |
| 13 | MCLR | | TCK/RA1 | 38 |
| 86 | ENVREG | | RA2/SCL2 | 58 |
| | | | RA3/SDA3 | 59 |
| 85 | VDDCORE | | TDI/RA4 | 60 |
| 54 | VBUS | | TD0/RA5 | 61 |
| 55 | VUSB | | RA6 | 91 |
| | | | RA7 | 92 |
| 16 | VDD | | RA9 | 28 |
| 2 | VDD | | RA10 | 29 |
| 37 | VDD | | RA14/SCL1 | 66 |
| 46 | VDD | | RA15/SDA1 | 67 |
| 62 | VDD | | | |
| 30 | AVDD | | AN0/RB0 | 25 |
| | | | AN1/RB1 | 24 |
| 15 | VSS | | AN2/RB2 | 23 |
| 36 | VSS | | AN3/RB3 | 22 |
| 45 | VSS | | AN4/RB4 | 21 |
| 65 | VSS | | AN5/RB5 | 20 |
| 75 | VSS | IC3 | PGEC2/AN6/RB6 | 26 |
| 31 | AVSS | | PGED2/AN7/RB7 | 27 |
| | | | AN8/RB8 | 32 |
| 93 | RE0 | | AN9/RB9 | 33 |
| 94 | RE1 | | AN10/RB10 | 34 |
| 98 | RE2 | | AN11/RB11 | 35 |
| 99 | RE3 | | AN12/RB12 | 41 |
| 100 | RE4 | | AN13/RB13 | 42 |
| 3 | RE5 | | AN14/RB14 | 43 |
| 4 | RE6 | | AN15/RB15 | 44 |
| 5 | RE7 | | | |
| 18 | RE8 | SCOOT2_PIC24FJ256GB110 | RC1 | 6 |
| 19 | RE9 | | RC2 | 7 |
| | | | RC3 | 8 |
| 87 | RF0 | | RC4 | 9 |
| 88 | RF1 | | RC12 | 63 |
| 52 | RF2 | | RC13 | 73 |
| 51 | RF3 | | RC14 | 74 |
| 49 | RF4 | | RC15 | 64 |
| 50 | RF5 | | | |
| 53 | RF8 | | RG0 | 72 |
| 40 | RF12 | | RG1 | 76 |
| 39 | RF13 | | RG2 | 77 |
| | | | RG3 | 78 |
| 90 | RG0 | | RG4 | 81 |
| 89 | RG1 | | RG5 | 82 |
| 57 | RG2/D+ | | RG6 | 83 |
| 56 | RG3/D- | | RG7 | 84 |
| 10 | RG6 | | RG8 | 68 |
| 11 | RG7 | | RG9 | 69 |
| 12 | RG8 | | RG10 | 70 |
| 14 | RG9 | | RG11 | 71 |
| 96 | RG12 | | RG12 | 79 |
| 97 | RG13 | | RG13 | 80 |
| 95 | RG14 | | RG14 | 47 |
| 1 | RG15 | | RG15 | 48 |

FIG. 8B-3

SYSTEMS AND METHODS FOR REGULATING VEHICLE ACCESS

CROSS REFERENCE TO OTHER APPLICATIONS

This application is a continuation of U.S. patent application Ser. No. 15/976,303, entitled SYSTEMS AND METHODS FOR REGULATING VEHICLE ACCESS filed May 10, 2018 which is incorporated herein by reference for all purposes, which is a continuation of U.S. patent application Ser. No. 15/653,275, entitled SYSTEMS AND METHODS FOR REGULATING VEHICLE ACCESS filed Jul. 18, 2017, now U.S. Pat. No. 10,086,796, which is incorporated herein by reference for all purposes, which is a continuation of U.S. patent application Ser. No. 15/411,916, entitled SYSTEMS AND METHODS FOR REGULATING VEHICLE ACCESS filed Jan. 20, 2017, now U.S. Pat. No. 9,738,255, which is incorporated herein by reference for all purposes, which is a continuation of U.S. patent application Ser. No. 14/668,781, entitled SYSTEMS AND METHODS FOR REGULATING VEHICLE ACCESS filed Mar. 25, 2015, now U.S. Pat. No. 9,586,559, which is incorporated herein by reference for all purposes, which is a continuation of PCT Application No. PCT/US13/61465, entitled SYSTEMS AND METHODS FOR REGULATING VEHICLE ACCESS filed Sep. 24, 2013, which is incorporated herein by reference for all purposes, which claims priority to U.S. Provisional Application No. 61/705,594, entitled SYSTEMS AND METHODS FOR REGULATING VEHICLE USE filed Sep. 25, 2012 which is incorporated herein by reference for all purposes.

BACKGROUND

The number of cars in cities continues to grow, placing an ever-increasing demand on a limited infrastructure of parking locations and roads. However, an appreciable fraction of these cars are in use only a relatively small fraction of the time. Drivers routinely commute without a car by walking, bicycling or by public transportation, and their cars remain idle most of the time. Still others may commute by car. Such cars make traffic worse and occupy a valuable parking spot most workdays.

SUMMARY

Recognized herein are various issues with present transportation methods, systems and models. For example, transportation models currently available do not permit a user to readily make a reservation for a given vehicle on an on-the-go basis.

The present disclosure provides systems that employ vehicle on-board electronics, an electronic device (e.g., Smart phone) of a user, and a computer server ("server"), all in concert, to provide the user access to the vehicle, vehicle security, and accurate tracking and monitoring of the vehicle. Such three-part system may afford each individual part the ability to communicate with each other part, which provides redundancy that may improve system reliability. In some examples, an electronic device (e.g., telephone, Smart phone) of the user can communicate with the on-board electronics of the vehicle through a local connection, such as universal serial bus (USB) or Bluetooth, WiFi, near field communication (NFC), or over-the-air by way of the server. This can permit the user to lock or unlock the vehicle even if there is no hardware connection or if the onboard electronics has no direct over-the-air connection to the server. Meanwhile, the on-board electronics of the vehicle can communicate with the server using either its own communications interface or the electronic device of the user. This may be useful in situations in which the vehicle is situated in a location in which the vehicle is incapable of communicating with the server, but may be capable of communicating with the electronic device of the user.

In some cases, the electronic device of the user is capable of determining whether the vehicle is in communication with the server. If the electronic device determines that the vehicle is not in communication with the server, the electronic device can notify the server that the vehicle is not in communication with the server once the electronic device is in communication with the server. In some cases, the electronic device can direct vehicle information from the vehicle to the server when the electronic device is in communication with the server.

In some examples, the server can track or otherwise monitor the vehicle using either an onboard communications interface of the vehicle, a communications interface of the electronic device of the user, or both.

In an aspect, a computer-implemented method for regulating vehicle access comprises (a) receiving, from an electronic device of a user, a request to access a vehicle, wherein the vehicle is disposed at a designated geographic location; (b) receiving, from the electronic device, geographic information of the user, the geographic information comprising a geographic location of the user, wherein the geographic information is determined using or with the aid of the electronic device of the user; and (c) providing the user access to the vehicle if, based on the geographic information received in (b), the geographic location of the user is within a given distance or range from the designated geographic location of the vehicle.

In an embodiment, providing the user access to the vehicle in (c) comprises directing from the server an access signal to the electronic device of the user or an electronic control unit of the vehicle. In another embodiment, the user is permitted to request access to the vehicle if the user is within a given geographic distance from the vehicle. In another embodiment, the method further comprises authenticating the user prior to providing the user access to the vehicle. In another embodiment, the request to access the vehicle is provided by the user using a graphical user interface of the electronic device of the user. In another embodiment, the vehicle is a motor scooter. In another embodiment, the electronic device is a mobile electronic device.

In an embodiment, the method further comprises permitting the user to use the vehicle. In another embodiment the user is permitted to use the vehicle if the electronic device of the user is coupled to the vehicle. In another embodiment, the user is permitted to use the vehicle if the electronic device of the user is coupled to an electronic control unit of the vehicle. In another embodiment, the user is permitted to use the vehicle if the electronic control unit or the electronic device detects that the user is wearing a safety device.

In an embodiment, the method further comprises receiving, from the electronic device of the user, a selection of a destination location of the vehicle. In another embodiment, the method further comprises displaying, on a graphical user interface of the electronic device of the user, the designated geographic location and the destination location.

In another aspect, a computer-implemented method for regulating vehicle use comprises (a) receiving, from an electronic device of a user, a request to access a vehicle at a designated geographic location; and (b) providing the user access to the vehicle at the designated geographic location if a geolocation of the user, as determined by the electronic device, is at or in proximity to a geolocation of the vehicle. In an embodiment, the method further comprises receiving, from the electronic device of the user, a selection of a designated destination location of the vehicle. In another embodiment, the method further comprises monitoring the use of the vehicle from the designated geographic location to the designated destination location.

In another aspect, an electronic control system for a vehicle comprises (a) an electronic control unit that is programmed or otherwise configured to permit use of the vehicle by a user when coupled to an electronic device of the user, wherein the electronic control unit comprises a communication interface that brings the electronic control unit in communication with the electronic device; and (b) a housing having a support member that removably mounts the electronic device of the user during use of the vehicle. In an embodiment, the electronic control unit comprises a communication interface that brings the electronic control unit in communication with a server that regulates vehicle access. In another embodiment, the electronic control unit is adapted to permit use of the vehicle if the electronic control unit detects an access signal in a memory location of the electronic control unit or the electronic device. In another embodiment, the access signal is provided by the electronic device or a server in remote communication with the electronic control unit.

In an embodiment, the electronic control unit is disposed in the housing. In another embodiment, the housing comprises a lid that seals the electronic device in the housing. In another embodiment, the housing comprises an electronic switch that (i) permits use of the vehicle when the lid seals the electronic device in the housing, and (ii) disables the vehicle from use when the lid does not seal the electronic device in the housing.

In an embodiment, the electronic device is a portable electronic device. In another embodiment, the electronic device is an instrument cluster of the vehicle. In another embodiment, the support member comprises one or more mounting brackets that mate with the electronic device. In another embodiment, the vehicle is a motor scooter.

In another aspect, a system for permitting vehicle access comprises (a) a computer server ("server") comprising a computer processor ("processor") for executing machine executable code for regulating vehicle access; (b) a vehicle having an electronic control unit, wherein the electronic control unit is programmed to communicate with the server; and (c) an electronic device removably coupled to the electronic control unit, wherein the electronic device comprises a processor that is programmed to (i) request, from the server, access to the vehicle, and (ii) monitor a state of the vehicle. In an embodiment, the state of the vehicle includes one or more of a geographic location, speed, and battery level of the vehicle. In another embodiment, the state of the vehicle includes indentifying information of the user. In another embodiment, the state of the vehicle includes vehicle emissions information. In another embodiment, the vehicle is a motor scooter. In another embodiment, the vehicle is powered in whole or in part by electrical energy (e.g., electrochemical energy storage device, solid state battery).

Another aspect provides a computer readable medium comprising machine-executable code that, upon execution by one or more computer processors, implements a method, the method comprising (a) receiving, from an electronic device of a user, a request to access a vehicle, wherein the vehicle is disposed at a designated geographic location; (b) receiving, from the electronic device, geographic information of the user, the geographic information comprising a geographic location of the user, wherein the geographic information is determined with the aid of or using the electronic device of the user; and (c) providing the user access to the vehicle if, based on the geographic information received in (b), a geographic location of the user is within a given distance or range from the designated geographic location of the vehicle. Providing the user access to the vehicle can comprise permitting the user to turn the vehicle on, drive the vehicle, park the vehicle, and turn the vehicle off.

Another aspect provides a computer readable medium comprising machine-executable code that, upon execution by a computer processor, implements any of the methods above or elsewhere herein, alone or in combination.

Another aspect provides a system comprising a computer processor (or other logic) and a memory location coupled to the computer processor, the memory location comprising machine-executable code that, upon execution by the computer processor, implements any of the methods above or elsewhere herein, alone or in combination.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the claimed invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." or "FIGs." herein) of which:

DETAILED DESCRIPTION

Figure 1A:
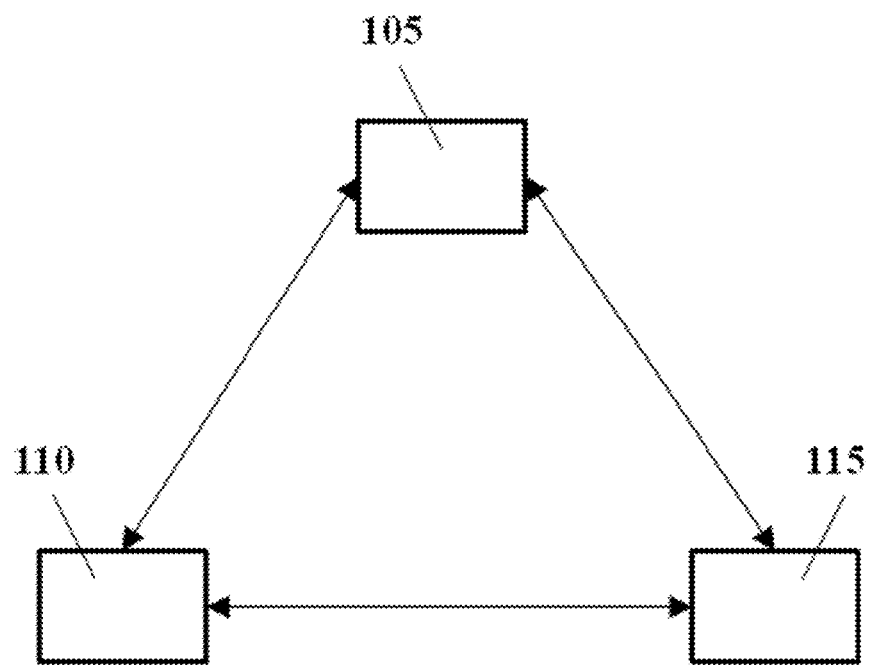
FIGS. 1A and 1B show systems for permitting vehicle access.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "vehicle," as used herein, generally refers to a mobile machine that is configured to transport a user or cargo from one point to another. A vehicle may travel on land, sea or air, or space. Examples of vehicles include, without limitation, bicycles, motor scooters (also "scooters" herein), motorcycles, cars (or automobiles), trains, ships, boats, aircraft and robots. In some cases, vehicles can be gas vehicles, electric vehicles, or gas-electric hybrid vehicles. In some examples, a vehicle is a motor scooter. A vehicle can be a personal transportation vehicle powered in whole or in part by electrical energy.

The term "user," as used herein, generally refers to an individual or entity that uses systems and methods of the disclosure. A user can be an individual or entity that wishes to use a vehicle. A user may be a rider (e.g., driver, passenger) of a vehicle.

The term "geographic location" (also "geo-location" and "geolocation" herein), as used herein, generally refers to the geographic location of an object, such as a user. A geolocation of a user can be determined or approximated using a geolocation device or system associated with the user, which may be an electronic device (e.g., mobile device) attached to or in proximity to the user. Geographic information can include the geographic location of the object, such as coordinates of the object and/or an algorithm or methodology to approximate or otherwise calculate (or measure) the location of the object, and, in some cases, information as to other objects in proximity to the object. In some examples, the geographic information of a user includes the user's geographic location and/or the location of one or more vehicles in proximity to the user. Geographic information can include the relative positioning between objects, such as between users, or a user and a vehicle. In some cases, the geolocation of an object (e.g., user, electronic device) is not necessarily the location of the object, but rather the location that the object enters an area or structure, such as a building.

A geolocation device may be a portable (or mobile) electronic device, such as, for example, a Smart phone (e.g., Apple® iPhone®, Android® enabled device) or tablet personal computer (e.g, Apple® iPad, Samsung® Galaxy Tab). In some cases, the geolocation of an object, such as a vehicle, can be determined using the manner in which a mobile device associated with the object communicates with a communication node, such as a wireless node. In an example, the geolocation of an object can be determined using node triangulation, such as, e.g., wireless node, WiFi (or Wi-Fi) node, satellite triangulation, and/or cellular tower node triangulation. In another example, the geolocation of a user can be determined by assessing the proximity of the user to a WiFi hotspot or one or more wireless routers. In some cases, the geolocation of an object can be determined using a geolocation device that includes a global positioning system ("GPS"), such a GPS subsystem (or module) associated with a mobile device (e.g., GPS capabilities of an Apple® iPhone® or Droid® based system).

In some situations, the geolocation of an object can be determined with the aid of visual and/or audio information captured by an electronic device of a user, such as, for example, images and/or video captured by a camera of the electronic device, or a peripheral device (e.g., Google® Glass) coupled to the electronic device.

Systems for Vehicle Access

An aspect of the invention provides a system for vehicle access, comprising a computer system coupled to a vehicle. In some embodiments, the computer system is directly coupled to the vehicle and an electronic device of a user. Alternatively, the computer system can be coupled to the vehicle through the electronic device of a user.

In some embodiments, a system for permitting vehicle access comprises a server comprising a processor for executing machine executable code for regulating vehicle access, a vehicle having an electronic control unit, and an electronic device removably coupled to the electronic control unit. The electronic control unit is configured to communicate with the server. The electronic device comprises a processor that is programmed to (i) request, from the server, access to the vehicle, and (ii) monitor a state of the vehicle. Access to the vehicle can include use of the vehicle, such as the ability to the turn the vehicle on or off, to drive the vehicle, park the vehicle, and use various components of the vehicle (e.g., radio).

The state of the vehicle can includes one or more of a geographic location, speed, and battery level of the vehicle. In some cases, the state of the vehicle can includes indentifying information of the user, such as the user's name or avatar, and contact information. The state of the vehicle can include vehicle emissions information, fault codes and/or other vehicle diagnostic data (e.g., blown headlight bulb, low tire pressure, etc.).

The vehicle can be a gas, electric or gas-electric (e.g., hybrid) vehicle. The vehicle can be powered in whole or in part by electrical energy. For instance, the vehicle can be an electric vehicle that is powered by an on-board energy storage device (e.g., battery), or powered by connectivity to an electric grid.

The vehicle can be a unicycle, bicycle, tricycle, scooter, motorcycle, car, train, ship, boat, aircraft or robot. In some examples, the vehicle is a scooter. The vehicle can be any mechanical device that is configured to transport a user from a first geolocation to a second geolocation.

Reference will now be made to the figures, wherein like numerals refer to like parts throughout. It will be appreciated that the figures are not necessarily drawn to scale. The figures are illustrative and are not intended to limit the invention.

Figure 1B:
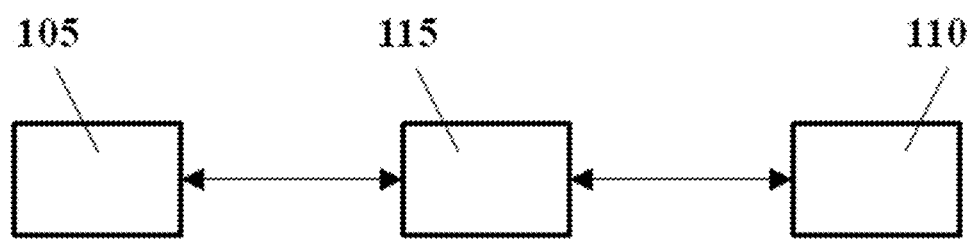

FIGS. 1A and 1B shows systems for permitting vehicle access. FIG. 1A shows a system 100 for permitting vehicle access, in accordance with an embodiment of the invention. The system 100 comprises a computer system 105 that is coupled (e.g., in communication with) to a vehicle 110 (e.g., scooter, motorcycle, car, truck, boat, helicopter, airplane, robot) and an electronic device 115 of a user. The electronic device 115 can be coupled to the vehicle 110. The computer system 105 and the electronic device 115 can be coupled to the vehicle 110 via a communication interface of an electronic system (not shown) of the vehicle 110. The electronic system of the vehicle 110 can be a native computer system, as may be provided by a manufacturer of the vehicle 110, or may be installed by a third-party manufacturer and, for example, retrofitted onto or otherwise integrated in the vehicle 110. The computer system 105, vehicle 110 and electronic device 115 can be coupled to one another through wired or wireless connectivity. Wired connectivity can include direct connection, such as through a wired communication interface, such as, for example, universal serial bus, FireWire, serial bus, audio jack (or audio connector). Wireless connectivity can include, for example Bluetooth, Global System for Mobile Communication (GSM), near field communication (NFC), cellular, radiofrequency or WiFi (or Wi-Fi) connectivity.

With reference to FIG. 1B, as an alternative, the computer system 105 can be directly coupled to the electronic device 115 of the user. The electronic device 115 can be directly coupled to the vehicle 110.

The computer system 105 can be a computer server programmed to accept reservation requests for a vehicle, confirm reservation requests, monitor and record vehicle usage information, monitor and record vehicle emissions information (e.g., carbon monoxide emissions, carbon dioxide emissions, NOx emissions, SOx emissions, particulate emissions), regulate vehicle access, monitor and record vehicle battery voltage and energy use, and monitor and record vehicle maintenance information, battery state and wear information, and incident (e.g., crash, rough usage) information.

Figure 2:
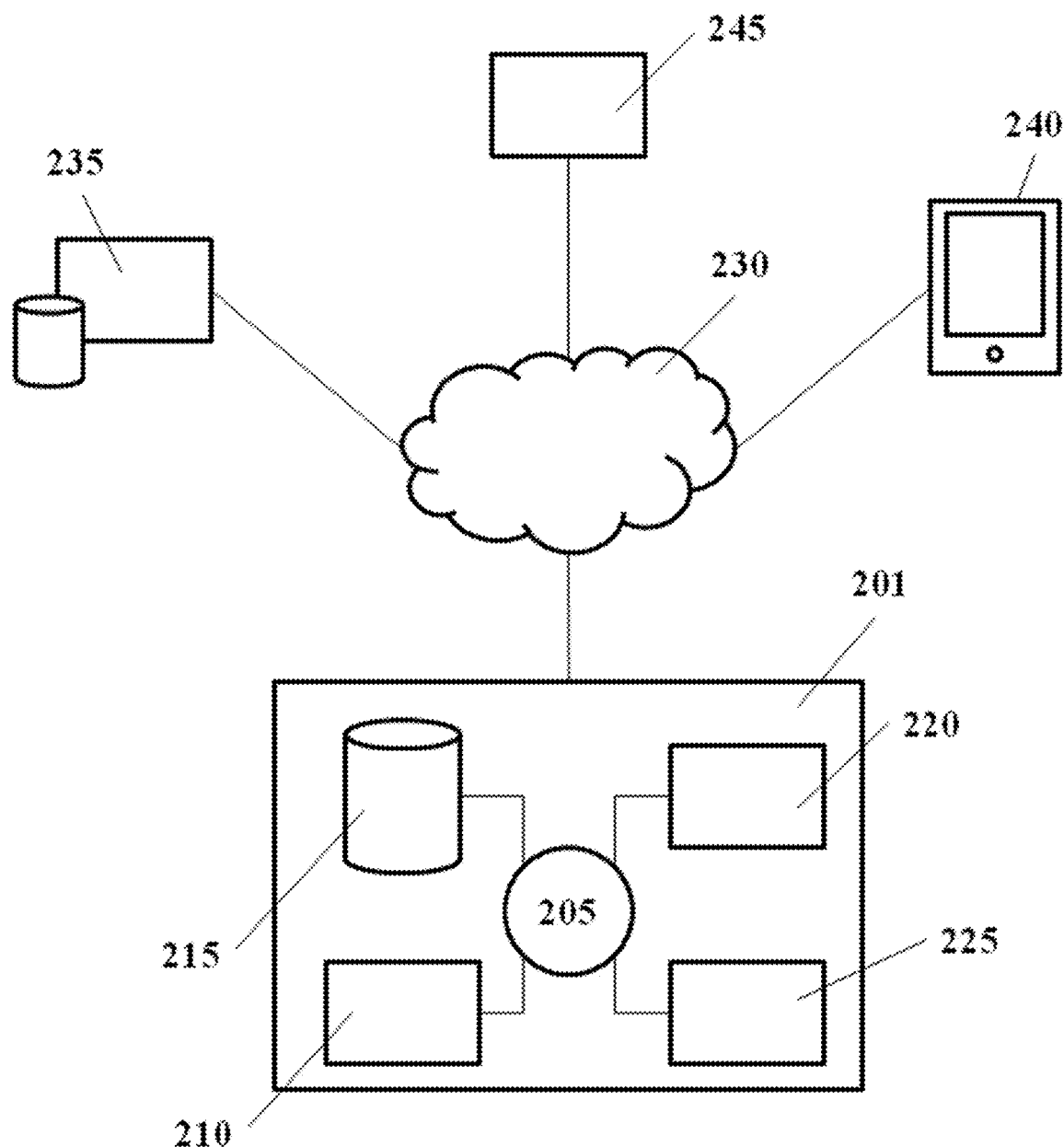
FIG. 2 shows a system adapted to provide vehicle access.

FIG. 2 shows a system 200 adapted to provide vehicle access, in accordance with an embodiment of the invention. The system 200 includes a computer server ("server") 201 that is programmed to implement methods described herein. The server 201 can be the computer system 105 of FIGS. 1A and 1B. The server 201 includes a central processing unit (CPU, also "processor" and "computer processor" herein) 205, which can be a single core or multi core processor, or a plurality of processors for parallel processing. The server 201 also includes memory 210 (e.g., random-access memory, read-only memory, flash memory), electronic storage unit 215 (e.g., hard disk), communications interface 220 (e.g., network adapter) for communicating with one or more other systems, and peripheral devices 225, such as cache, other memory, data storage and/or electronic display adapters. The memory 210, storage unit 215, interface 220 and peripheral devices 225 can be in communication with the CPU 205 through a communications bus (solid lines), such as a motherboard. The storage unit 215 can be a data storage unit (or data repository) for storing data. The server 201 is operatively coupled to a computer network ("network") 230 with the aid of the communications interface 220. The network 230 can be the Internet, an internet and/or extranet, or an intranet and/or extranet that is in communication with the Internet. The network 230 in some cases is a telecommunication and/or data network. The network 230 can include one or more computer servers, which can enable distributed computing, such as cloud computing. The network 230 in some cases, with the aid of the server 201, can implement a peer-to-peer network, which may enable devices coupled to the server 201 to behave as a client or a server.

The storage unit 215 can store data, such as data related to vehicles and users (e.g., user profiles). The server 201 in some cases can include one or more additional data storage units that are external to the server 201, such as located on a remote server that is in communication with the server 201 through an intranet or the Internet.

The storage unit 215 can store user vehicle user information, such as reservation information, booking information, vehicle use information, vehicle use payment information, and subscription payment information. Examples of vehicle use information include distance traveled, time a vehicle is reserved, time a vehicle is accessed for use, time a vehicle is returned from use and total time a vehicle is used. Vehicle use information may include speed (e.g., minimum, maximum, average), acceleration, the relationship between battery use and terrain covered (e.g., the effect that a steep hill has on battery level), or battery use and speed, the relationship between battery charging measurements (e.g., electric current, electric voltage), time, battery charge level, amount of fuel or electrical energy used, and zones or regions traveled (e.g., if cost of vehicle use is assessed on a zone basis). Vehicle use information may include incidents (e.g., crash sensing), monitoring of proper or improper functioning and detection of problems, monitoring of driving (e.g., turn signal usage). Monitoring over time may permit prediction of wear, such as battery or tire wear.

The server 201 can communicate with one or more remote computer systems through the network 230. In the illustrated example, the server 201 is in communication with a first computer system 235 and a second computer system 240 that are located remotely with respect to the server 201, the first computer system 235 and the second computer system 240 can be a user computer systems that are configured to permit users to reserve one or more vehicles. The first computer system 235 and second computer system 240 can be, for example, personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants.

In some situations the system 200 includes a single server 201. In other situations, the system 200 includes multiple servers 201 that are in communication with one another through an intranet and/or the Internet.

The server 201 can be adapted to store user profile information, such as, for example, a name, physical addresses (e.g., home, work, school, social scenes, gym, stores frequented), email address(es), telephone number(s), instant messaging (IM) handle(s), educational information, work information, social like(s) and/or dislike(s), vehicle like(s) and/or dislike(s), historical information of the user (which may vehicles authorized by the system 200 for use by a user), and other information of potential relevance to the user and the system 200. Such profile information can be stored on the storage unit 215 of the server 201.

The server 201 can be adapted to store various user vehicle use information, such as vehicle use history, locations where a vehicle was picked off and/or dropped off, locations traveled, times traveled, average time traveled, pollution emitted during travel, emissions saved during travel, and cost for use of the vehicle during travel or multiple travels. In some situations the server 201 makes a pollution determination based on estimated averages of emissions by other vehicle types and estimates of emissions associated with vehicle energy (e.g., electricity) needs.

The server 201 can be adapted to store various vehicle information, such as whether a vehicle is parked, active, or inactive, whether a vehicle is charging or charged (e.g., in cases in which the vehicle is an electric or gas-electric vehicle), time to charge for a vehicle, which user has reserved a vehicle, which user is using a vehicle, and a location of the vehicle, such as the parking location of present location of the vehicle. The location of the vehicle can be provided on a map, such as on a graphical user interface of the server or an electronic device coupled to the server, or provided in terms of geographic coordinates (e.g., latitude, longitude and altitude). The server 201 can store information about various vehicle makes and models, in order to provide help to riders, or service personnel, for example.

The server 201 can be programmed to provide various notifications to a user, such as when the user has reserved a vehicle, when the vehicle is ready for use, and other vehicle state information (e.g., vehicle charging, vehicle charged, vehicle disabled or available range). Such notifications can be provided to the user electronically, such as, for example, by email, push notification, text message, or other electronic notification on a graphical user interface of an electronic device of the user. The server can also provide the user directions to a reserved vehicle, or a vehicle that the user may wish to reserve or use. The server 201 can provide the user with instructional information for the vehicle being used, including, but not limited to, instructions for normal use, instructions for unusual use or situations, and feedback tailored based on user behavior or the behavior of other users (e.g., drivers).

Methods as described herein can be implemented by way of machine (or computer processor) executable code (or software) stored on an electronic storage location of the server 201, such as, for example, on the memory 210 or electronic storage unit 215. During use, the code can be executed by the processor 205. In some cases, the code can be retrieved from the storage unit 215 and stored on the memory 210 for ready access by the processor 205. In some situations, the electronic storage unit 215 can be precluded, and machine-executable instructions are stored on memory 210. Alternatively, the code can be executed on the second computer system 240 of the user.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Aspects of the systems and methods provided herein, such as the server 201, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawing(s). Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

In some cases, the server 201 can be configured for data mining, extract, transform and load (ETL), or spidering (including Web Spidering where the system retrieves data from remote systems over a network and access an Application Programmer Interface or parses the resulting markup) operations, which may permit the system to load information from a raw data source (or mined data) into a data warehouse. The data warehouse may be configured for use with a business intelligence system (e.g., Microstrategy®, Business Objects®). The media file management system can include a data mining module adapted to search for media content in various source locations, such as email accounts and various network sources, such as social networking accounts (e.g., Facebook®, Foursquare®, Google+®, Linkedin®) or on publisher sites, such as, for example, weblogs.

The results of a user-initiated search for a vehicle can be presented to a user with the aid of a user interface (UI), such as a graphical user interface (GUI), on an electronic device of the user. In some situations, a GUI can enable a user to access the results of a search for vehicles at a designated geographic.

The UI, such as GUI, can be provided on a display of an electronic device of the user that is adapted to provide geolocation information of the user, such as, for example, measure (or calculate) the geolocation of the user. The display can be a capacitive or resistive touch display, or a head-mountable display (e.g., Google® Goggles). Such displays can be used with other systems and methods of the disclosure.

Methods of the disclosure may be facilitated with the aid of applications (apps) that can be installed on electronic devices of users. An app can include a GUI on a display of the electronic device of the user. The app can be configured to perform certain functions of the system, such as, for example, permitting a user to reserve a vehicle and access the vehicle if the user is within a given distance from the vehicle. In an example, if the user is within a given distance from the vehicle, the app can permit the user to request to use the vehicle, which request is directed to the system. The system can then direct an access signal (e.g., access code) to an electronic device of the user or the vehicle, which signal can permit the user to access the vehicle. The user can subsequently proceed to use the vehicle, such as by coupling an electronic device of the user to the vehicle and driving the vehicle.

In some cases, a user may gain access to a vehicle by scanning a quick response (QR) code with an electronic device of the user, such as a Smart phone; entering a code printed on the vehicle, such as into an electronic device of the user coupled with the server; by being location with a given distance from the vehicle or reserved vehicle; by being within wireless (e.g., WiFi) range of the reserved vehicle; or by a synchronized bump motion or gesture using the electronic device of the user.

Access signals of the description can be encrypted. Encrypted access signals can be decrypted with the aid of hardware and/or software on electronic control units of vehicles of the disclosure and/or electronic devices of users.

Vehicle Access Methods

Another aspect of the invention provides methods for accessing vehicle. Vehicle access may include locking and unlocking a vehicle, turning the vehicle on or off, enabling or disabling a vehicle security system, and driving the vehicle. Methods provided herein can be implemented with the aid of computer systems of the disclosure, such as the server 201 of FIG. 2.

Vehicles of the present disclosure can be configured for remote access. In some situations, a mobile device of a user or other remote computer system of the user or another user can be used to provide the user access to a vehicle and assets of the vehicle. For example, the user can use an app on a mobile device of the user to unlock the vehicle and various assets in the vehicle, such as keys and documents (e.g., proof of insurance, registration, etc.).

Figure 3:
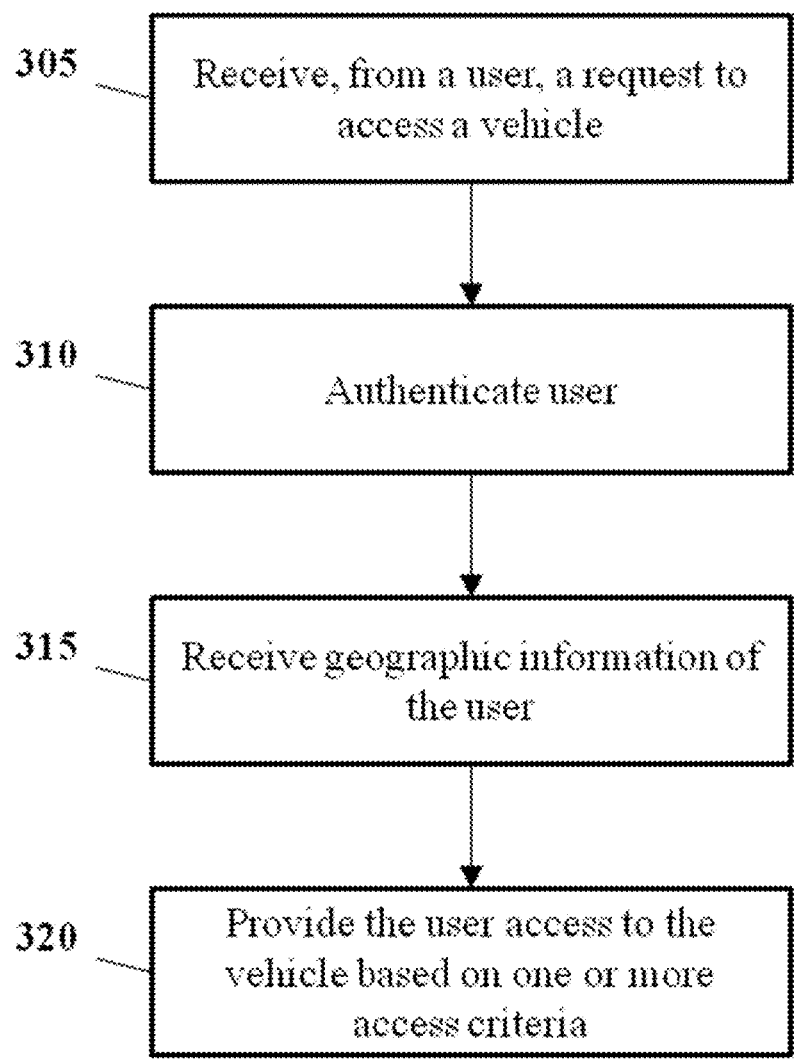
FIG. 3 schematically illustrates a computer-implemented method for regulating vehicle access.

FIG. 3 schematically illustrates a computer-implemented method 300 for regulating vehicle access. In a first operation 305, a request to access a vehicle is received from an electronic device of a user. The electronic device can be a portable electronic device, such as a portable computer, telephone, or Smart phone. The request can be received by a server regulating vehicle access, such as, for example, the server 201 of FIG. 2. Such request may be directed from the user to the server upon user input into the electronic device of the user. The vehicle can be disposed at a designated geographic location.

Next, in a second operation 310, the identity of the user is authenticated, such as, for example, by the server. The user may be authenticated using identifying information of the user, such as, for example, user log-in information and/or a pass code (e.g., pin, password). The second operation 310, in some cases, can be precluded.

Next, in a third operation 315, geographic information of the user is received by the server. The geographic information can be determined with the aid of the electronic device of the user.

Next, in a fourth operation 320, the user is provided access to the vehicle if one or more vehicle access criteria are met. The one or more vehicle access criteria can include the elapsed time between user check-in to a given vehicle and attempt by the user to use the vehicle, the proximity of the user to the vehicle, whether the vehicle is in use by another user, whether the identity of the user has been successfully authenticated by the server, whether a geographic location of the user is within a given distance from a designated geographic location of the vehicle, and whether the electronic device of the user is coupled to an electronic control unit of the vehicle.

Upon being granted access to the vehicle, the user may be permitted to use (e.g., operate) the vehicle. In some cases, the user is permitted to use the vehicle if the electronic device of the user is coupled to (e.g., attached to or in communication with) the vehicle, such as an electronic control unit of the vehicle. In some cases, the electronic control unit is programmed to i) permit vehicle access and/or use by the user when the electronic device of the user is coupled to the electronic control unit, and ii) not permit vehicle access and/or use by the user when the electronic device of the user is not coupled to the electronic control unit. In some examples, the user is permitted to use the vehicle if the electronic device of the user is coupled to an electronic control unit of the vehicle. An electronic device can be coupled to an electronic control unit of a vehicle by, for example, direct connection (e.g., through a wire) or wirelessly (e.g., by Bluetooth or WiFi connectivity).

The user can be provided access to the vehicle by directing, from the server, an access signal to the electronic device of the user or the vehicle. In some examples, access is granted to the user by directing an access signal from the server to the electronic device of the user. The user can subsequently use the vehicle by coupling the electronic device to the vehicle, in which case the access signal can be directed from the electronic device of the user (e.g., from a memory location of the electronic device) to an electronic control unit of the vehicle. The electronic device can be coupled to the vehicle by either wireless or wired connectivity between the electronic device and the electronic control unit. Wired connectivity can be implemented with the aid of a USB, audio jack or other wired interface of the electronic device. Alternatively, the electronic control unit may recognize the access signal on the electronic device of the user, such as, for example, the memory location. In other examples, access is granted to the user by directing an access signal from the server to the vehicle. In some embodiments, the user is permitted to access (e.g., drive) the vehicle when the user couples the electronic device of the user to the electronic control unit of the vehicle. In other situations, the user may be permitted to access the vehicle without having to couple the electronic device to the electronic control unit of the vehicle. Wireless connectivity can be implemented using a wireless communication interface, such as, for example, Bluetooth or WiFi, or other wireless interfaces described herein.

The user can be permitted to request to access the vehicle if the user is within a given geographic distance from the vehicle. In some cases, the user is permitted to request to access the vehicle by conducting an electronic check-in to the vehicle. The user may be permitted to request to access the vehicle when the user is within a given geographic distance from the vehicle. The given geographic distance can be a distance that is at most about 0.01 miles, 0.1 mile, 0.2 miles, 0.3 miles, 0.4 miles, 0.5 miles, 0.6 miles, 0.7 miles, 0.8 miles, 0.9 miles, 1 mile, 2 miles, 3 miles, 4 miles, 5 miles, 10 miles, 20 miles, 30 miles, 40 miles, 50 miles, or 100 miles. In some situations, upon the user requesting to access the vehicle, the server reserves the vehicle for a given time period, such as a time period of at most about 5 seconds, 10 seconds, 20 seconds, 30 seconds, 1 minute, 2 minutes, 3 minutes, 4 minutes, 5 minutes, 6 minutes, 7 minutes, 8 minutes, 9 minutes, 10 minutes, 15 minutes, 20 minutes, 25 minutes, 30 minutes, 40 minutes, 50 minutes, 1 hour, 2 hours, 3 hours, 4 hours, 5 hours, 6 hours, 12 hours, 1 day, 2 days, 3 days, 4 days, 5 days, 6 days, 1 week, 2 weeks, 3 weeks, 4 weeks, or 1 month. Within this period, other users may not be permitted to request to access and use the vehicle.

In some situations, when the user has requested to access a vehicle and the vehicle has been reserved for the user, the server monitors the geographic location of the user. If the server determines that the user has travelled beyond a use radius, the server permits other users to reserve the vehicle. The use radius can be a radius that is at most about 0.01 miles, 0.1 mile, 0.2 miles, 0.3 miles, 0.4 miles, 0.5 miles, 0.6 miles, 0.7 miles, 0.8 miles, 0.9 miles, 1 mile, 2 miles, 3 miles, 4 miles, 5 miles, 10 miles, 20 miles, 30 miles, 40 miles, 50 miles, or 100 miles from a geographic location of the vehicle.

Upon the user requesting to access the vehicle, the server may permit the user to access (e.g., turn on, drive) the vehicle if the user is within a given distance from the vehicle. In some cases, the user is permitted to access the vehicle if the user is within a given geographic distance from the vehicle. The given geographic distance can be a distance that is at most about 0.01 miles, 0.1 mile, 0.2 miles, 0.3 miles, 0.4 miles, 0.5 miles, 0.6 miles, 0.7 miles, 0.8 miles, 0.9 miles, 1 mile, 2 miles, 3 miles, 4 miles, 5 miles, 10 miles, 20 miles, 30 miles, 40 miles, 50 miles, or 100 miles. In some embodiments, if the user is within the given geographic distance from the vehicle, the server directs an access signal (e.g., access code) to the electronic control unit of the vehicle of the electronic device of the user, or both.

The server may monitor a trajectory of movement of a user towards or away from a vehicle. If the server determines that the user is moving towards the vehicle, then the server may direct an access signal to the electronic device of the user and/or the vehicle to permit the user to use the vehicle. For example, the server records a geographic of the user at a first time point and records a geographic location of the user at a second time point. The server then calculates a trajectory of the user from the locations at the first and second time points. If the location is directed at or in proximity to the vehicle, then the server directs an access signal to the electronic device of the user or the vehicle, or both.

The user can request to access the vehicle by directing a request (e.g., conducting a check-in) with the aid of a user interface, such as a graphical user interface, of the electronic device of the user. For example, the user can conduct a check-in to the vehicle using a GUI of the electronic device of the user, and the server reserves the vehicle for the user for a period of about 15 minutes. When the user is in proximity to the vehicle, the server directs an access signal to the electronic device of the user or the electronic control unit of the vehicle. The access signal permits the user to use the vehicle when the user couples the user's electronic device to the electronic control unit of the vehicle.

Vehicle Electronic Control Systems

Another aspect of the invention provides an electronic control system for a vehicle. The vehicle, in some cases, is a motor scooter. The electronic control system comprises an electronic control unit for permitting use of the vehicle when coupled to an electronic device of a user. The electronic control unit comprises a communication interface for bringing the electronic control unit in communication with the electronic device. The electronic control system further comprises a housing having a support member that removably (or detachably) mounts the electronic device of the user during use of the vehicle.

The communication interface can be a wired or wireless interface. Wired interfaces include universal serial bus (USB), FireWire, or other wired communication protocol, such as serial bus communication protocol or audio interface (e.g., audio port connection). Wireless interfaces include Bluetooth, Global System for Mobile Communication (GSM), near field communication (NFC), cellular, radiofrequency or WiFi (or Wi-Fi) connectivity.

The electronic control unit can be in electrical communication with other mechanical and/or electronic components of the vehicle, such as one or more of an alarm system of the vehicle, an energy storage system of the vehicle (e.g., battery), a lighting system of the vehicle, a drive or power train of the vehicle, a transmission of the vehicle, and a braking system of the vehicle.

The electronic control unit can include a communication interface for bringing the electronic control unit in communication with a server for regulating vehicle access. In some examples, the server is the server 201 of FIG. 2.

The electronic control unit is adapted to permit use of the vehicle if the electronic control unit detects an access signal in a memory location of the electronic control unit or the electronic device. The access signal can be provided by the electronic device or a server. In some examples, the server provides the access signal to the electronic control unit. In other examples, the server provides the access signal to the electronic device. When the electronic device is coupled (e.g., brought in communication with) the electronic control unit, the access signal may be transferred from the electronic device to the electronic control unit, or, as an alternative, the electronic control unit may determine that the electronic device has received the access signal. In both cases, the electronic control unit may permit the user to use the vehicle.

In some situations, the electronic device or the electronic control unit may authenticate the access signal. If the access signal passes authentication, the user is permitted to use the vehicle; otherwise, the electronic device or the electronic control unit may request another access signal from the server.

The electronic control unit can be disposed in the housing of the electronic control system, which housing can include the support member for the electronic device of the user. As an alternative, the electronic control unit can be disposed in another housing. The other housing can be situated adjacent to the housing having the support member.

The housing can be a circular, oval, triangular, square, rectangular, pentagonal, hexagonal, heptagonal, or octagonal housing, or any combination or partial shape thereof (e.g., semi-circular). The housing can a width between about 1 inch and 12 inches, or 3 inches and 8 inches; a length between about 1 inch and 12 inches, or 3 inches and 8 inches; and a height between about 1 inch and 6 inches, or 2 inches and 4 inches. The housing may be formed of a polymeric material (e.g., plastic), metallic material (e.g., aluminum), or composite material.

The support member in the housing can include one or more mounting brackets for mating with the electronic device. Examples of mounting brackets include, without limitation, hooks, clips, hook-and-loop fasteners (e.g., Velcro® fasteners), and magnetic fasteners.

The housing can include an opening that permits the user to insert the electronic device of the user into the housing. In some cases, the user inserts the electronic device into the housing to couple the electronic device to the electronic control unit, such as by plugging the electronic device into the communication interface of the electronic control unit.

The housing can include a cover that seals the electronic device in the housing. The cover can be a lid. The cover can be adapted to seal the opening of the housing. The lid can be at least partially transparent to visible light (i.e., light having wavelengths from about 390 nm to 750 nm). In some cases, the lid is substantially transparent to visible light. The lid can be formed of a metallic material, composite material, or polymeric material, such as, for example, a transparent plastic. In some examples, the lid is formed of polycarbonate.

The housing can include an interlock (e.g., switch) that (i) permits use of the vehicle when the lid seals the electronic device in the housing, and (ii) disables the vehicle from use when the lid does not seal the electronic device in the housing. The electronic switch can be coupled to an integrated circuit of the electronic control unit.

The electronic device of the user can be a portable electronic device. In some examples, the electronic device is a personal computer (e.g., portable PC), slate or tablet PC (e.g., Apple® iPad, Samsung® Galaxy Tab), telephone, Smart phone (e.g., Apple® iPhone, Android-enabled device, Blackberry®), or personal digital assistant.

The electronic device can be an instrument cluster of the vehicle. The instrument cluster can be provided on a graphical user interface (GUI) on an electronic display of the electronic device. The instrument cluster can include a speedometer, which may be displayed with a digital readout. The GUI may display information of or related to the vehicle, such as, for example, a location of the vehicle (e.g., on a map), whether the vehicle is on or off, length of time that the vehicle has been in use by the user, length of time remaining on the user's reservation of the vehicle, usage cost for use of the vehicle by the user, emissions information (e.g., $CO_2$ emitted), amount of fuel left in the vehicle, level (e.g., percentage) of charge or state of charge of the energy storage device (e.g., battery) of the vehicle, and the length of time remaining before the energy storage device of the vehicle requires charging.

Figure 4:
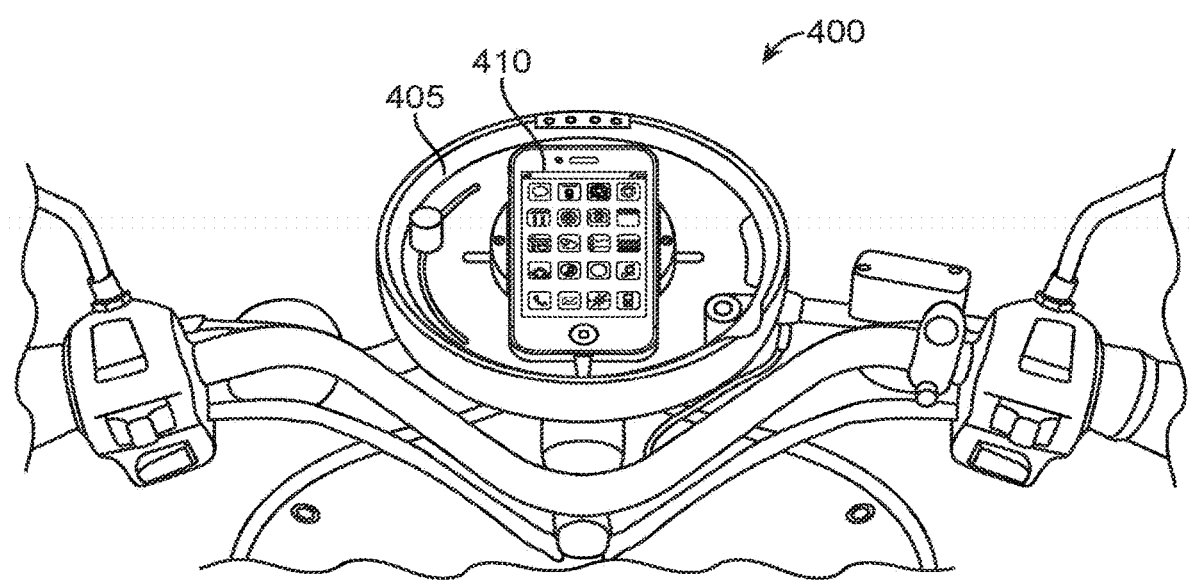
FIG. 4 shows an electronic cluster of a vehicle.

FIG. 4 shows an electronic cluster of a vehicle 400 having a support member 405 for an electronic device 410. The electronic device 410 in the illustrated example is a Smart phone (e.g., Apple® iPhone) that is coupled to an electronic control unit (not shown) of the vehicle 400 through a connector. The vehicle in the illustrated example is a scooter.

Figure 5:
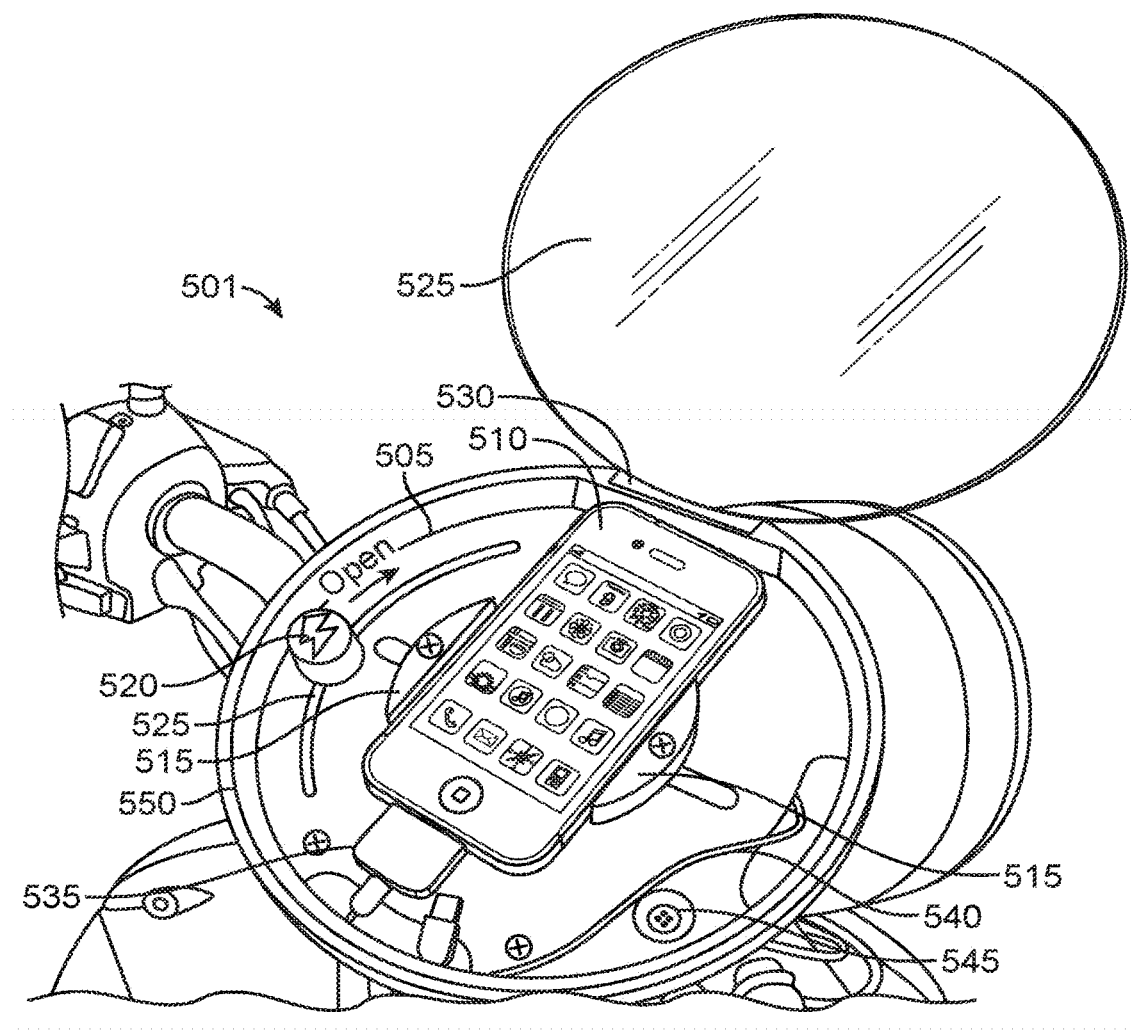
FIG. 5 shows an electronic cluster of a vehicle.

FIG. 5 shows an electronic cluster 501 of a vehicle having a support member 505 with an electronic device 510 mounted on the support member 505. The electronic cluster 501 is mounted on a vehicle (e.g., scooter). The support member 505 includes a cavity or chamber that holds the electronic device 510 during use of the vehicle. The electronic device 510 is mounted on the support member 505 with the aid of gripping members (also "grippers" herein) 515. The support member 505, together with the grippers 515, may be referred to as a "dock." The support member 505 includes a gripping member 515 on each side of the electronic device 510. The gripping members 515 engaged and disengage the electronic device upon movement of a lever 520 up and down a track 525. In the illustrated example, sliding the lever 520 up (along the direction of "open") releases the gripping members 515 from contacting the electronic device 510, and sliding the lever 520 down brings the gripping members 515 in contact with the electronic device 510 to secure the electronic device 510.

The electronic cluster 501 includes a cover 525 that is configured to pivot about a pivot point 530 to seal the electronic device 510 in the support member 505. The cover 525 may be closed and opened manually (i.e., upon user engagement of the cover 525). As an alternative, the cover 525 may be adapted to automatically open and close, such as based on a velocity (or speed) of the vehicle. For example, the cover 525 may open when the vehicle is moving at a speed greater than 0 miles per hour, and open when the vehicle has stopped.

In the illustrated example, the electronic cluster 501 is mounted between handle bars of the vehicle. However, the electronic cluster 501 may be mounted at other locations of the vehicle.

With continued reference to FIG. 5, the electronic device 510 is coupled to an electronic control unit (not shown) of the vehicle with the aid of a dock connector 535 that is in electrical communication with the electronic control unit through a cable 540.

The support member 505 may include dock connectors that are adapted for attachment to various electronic devices. In some examples, the dock connector is a 9-pin, 19-pin or 30-pin connector. In other examples, the dock connector is a USB connector or audio connector.

The support member 505 further includes a latch 545. The latch may be a magnetic latch 545. The latch 545 is adapted to seal the cover 525 against a lip 550 of an opening of the support member 505. The lip 550, in some cases, can include a gasket that forms a seal between the cover 525 and the lip 550.

The grippers 515 may be spring-loaded grippers. The grippers 515 may hold or secure the electronic device 510 when the lever 520 slides along the track to "closed" position. The grippers 515 may release the electronic device 510 when the lever 520 slides along the track to an "open" position. An area between the grippes may be sized to secure various types of electronic devices, such as telephones, Smart phones and tablet personal computers (e.g., Apple® iPad). In some examples, grippers 515 provide a universal Smart phone mount.

The dock can protect the electronic device 510 from, for example, inclement weather and debris, and road jostling. The design of the dock can be prohibit riders from interacting with the electronic device 510 while the vehicle is in use. In some examples, an interlock (e.g., switch) disables the vehicle when dock lid 525 is open.

Figure 6:
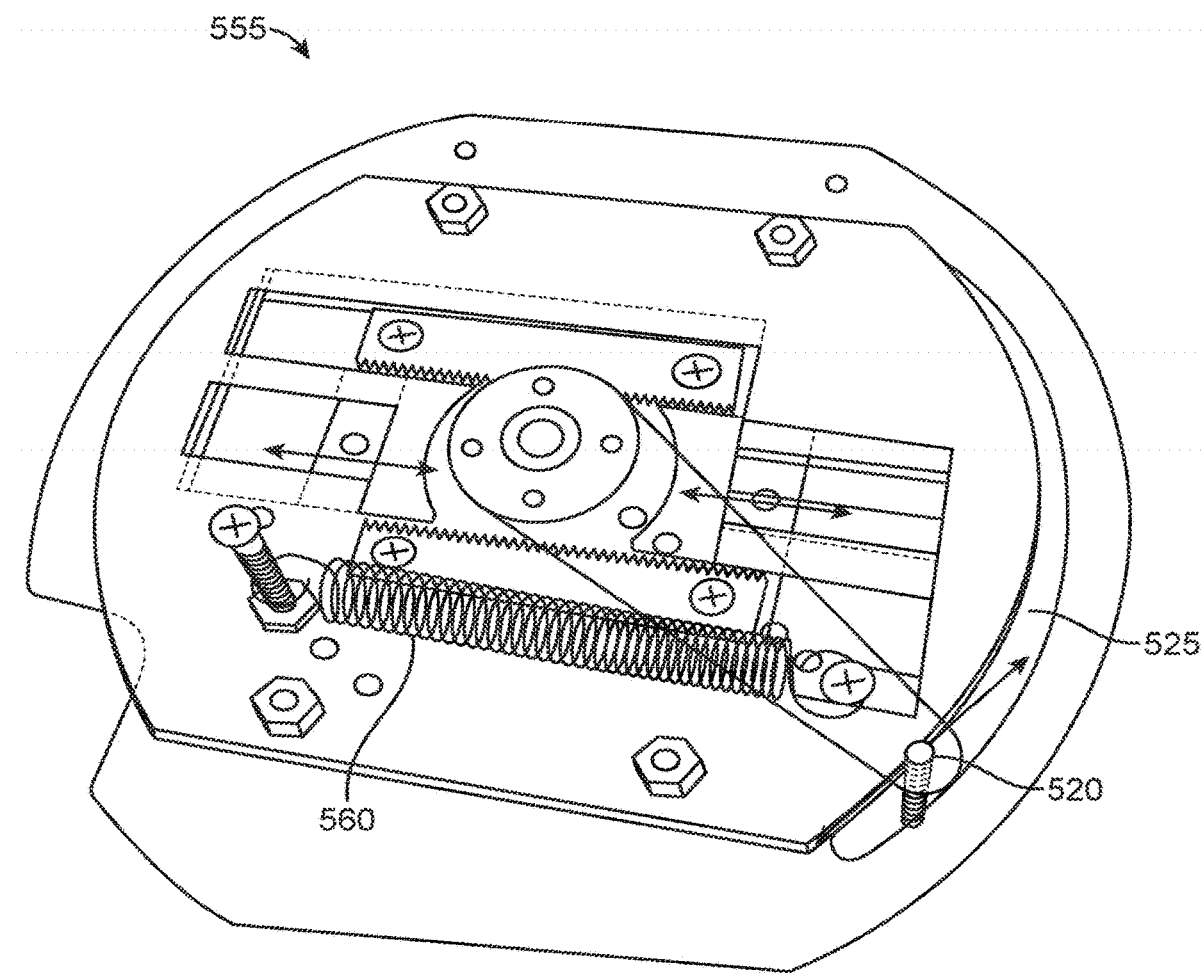
FIG. 6 shows a gripping apparatus of the electronic cluster of FIG. 5.

With reference to FIG. 6, the electronic cluster 501 includes a gripping apparatus 555 that is coupled to the gripping members 515 of the support member 505. The gripping apparatus 555 can be located on an underside of the support member 505. The gripping apparatus 555 can be spring-loaded. A spring 560 coupled to the lever provides a restorative force that aids to disengage the gripping members 515 from the electronic device 510 upon movement of the lever towards the bottom of the track 525. Alternatively, the restorative force can be provided with the aid of an actuator. The location of the griping members 515 is shown by the two-way arrows in FIG. 6.

The gripping apparatus 555 can include an actuator or other motor for moving the gripping members 515. The actuator, for instance, can be configured to bring the gripping members 515 in contact with the electronic device 510, and remove the gripping members 515 from contact with the electronic device 510.

Figure 7:
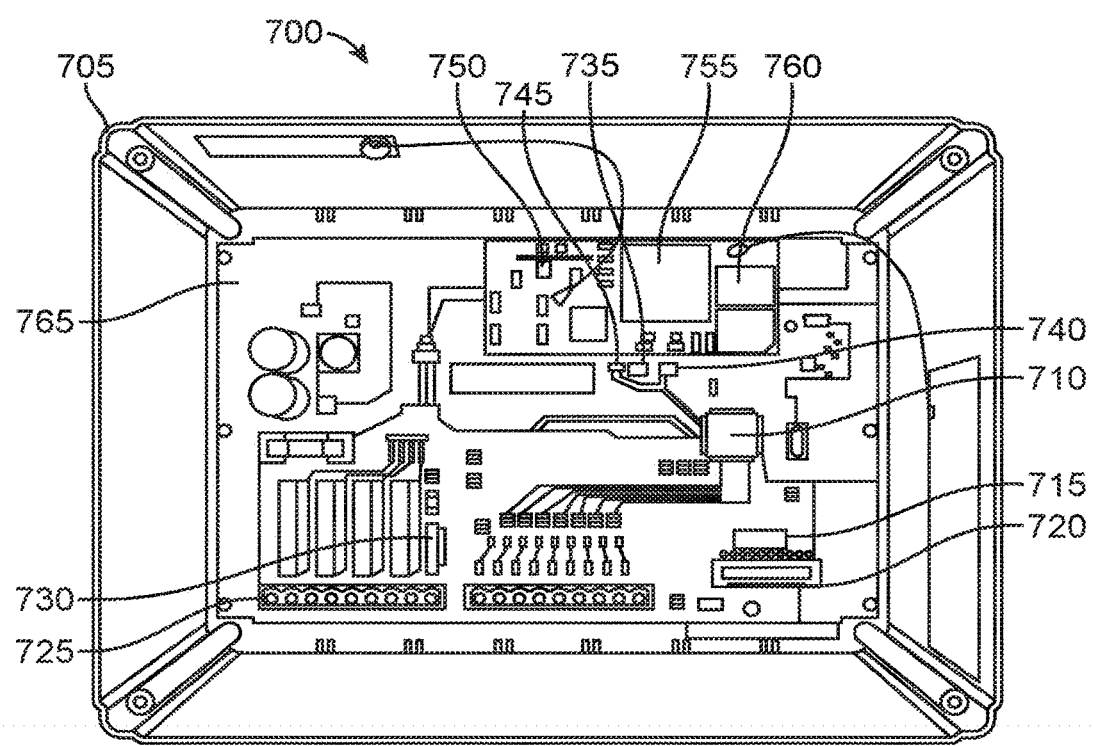
FIG. 7 shows an electronic control unit for use with a vehicle.

FIG. 7 shows an electronic control unit 700, in accordance with an embodiment of the invention. The electronic control unit 700 may be adapted for use with vehicles described herein. The electronic control unit 700 can be configured to permit access to, and use of, a vehicle, in some cases with the aid of an electronic device of a user.

The electronic control unit 700 includes a housing 705 that can be disposed at an underside of an electronic cluster, such as the electronic cluster 501 of FIG. 5. The control unit 700 includes a processor (e.g., microprocessor) 710, a first electronic device interface 715 and a second electronic device interface. In some examples, the first electronic device interface 715 is suited for a first type of Smart phone (e.g., Android® enabled device), and the second electronic device interface 720 is suited for another type of Smart phone (e.g., Apple® iPhone). The interfaces can be in electrical communication with cables (not shown) that extend into an electronic cluster (see, e.g., FIG. 5). The control unit 700 also includes a vehicle electrical interface 725 for coupling the control unit 700 to electronic components of the vehicle (e.g., scooter). The control unit 700 includes a power measurement member 730 for measuring current delivered to the vehicle during any charging of the vehicle.

The electronic control unit 700 further includes memory 735, an encryption processor 740, and an accelerometer 745. The memory 735 can include software that is executable by the processor 710. The encryption processor 740 can be used to encrypt data transmitted to and from the control unit, such as, for example, communications data from the control unit to a server, and from the server to the control unit 700. The accelerometer 745 may be used to measure acceleration, and in some cases vibration. The accelerometer 745 can be employed to observe driving patterns and give recommendations or advice to the user, such as, for example, if the electronic control unit 700 or an electronic device coupled to the electronic control unit 700 suspects that the user is having trouble driving or is driving in a potentially unsafe or dangerous manner.

The control unit 700 can include a GPS module 750 and cellular interface 755 for enabling the control unit 700 to communicate with a server, such as the server 201 of FIG. 2. The control unit 700 further includes a subscriber identity module or subscriber identification module (SIM) card 760, which, in some cases, can be an integrated circuit that securely stores the International Mobile Subscriber Identity (IMSI) and the related key used to identify and authenticate the vehicle.

The electronic control unit 700 can include other wireless interfaces, such as a WiFi interface or a Bluetooth interface (not shown). The wireless interfaces can be used to bring the electronic control unit 700 in communication with an electronic device of a user.

The components of the control unit 700 may be formed on a circuit board 765. The circuit board 765 may be a printed circuit board.

The control unit 700 can permit a user to charge an electronic device of the user when the electronic device is coupled to the control unit 700. In some cases, the control unit will charge the electronic device of the user only if the control unit (or server) has successfully authenticated the user.

The GPS module 750 can detect vehicle movement. This may be used to detect if the vehicle is being moved by an unauthorized user (e.g. if the vehicle has been hauled away on a truck). In some examples, if unauthorized vehicle movement is detected, a server coupled to the electronic control unit 700 can implement one or more security features selected from providing a visual alarm (e.g., flashing lights), sounding an auditory alarm and notifying authorities and/or a server coupled to the electronic control unit 700. The electronic control unit 700 may record the location of the vehicle during unauthorized movement to aid in retrieval vehicle.

Figures 1, 8A:
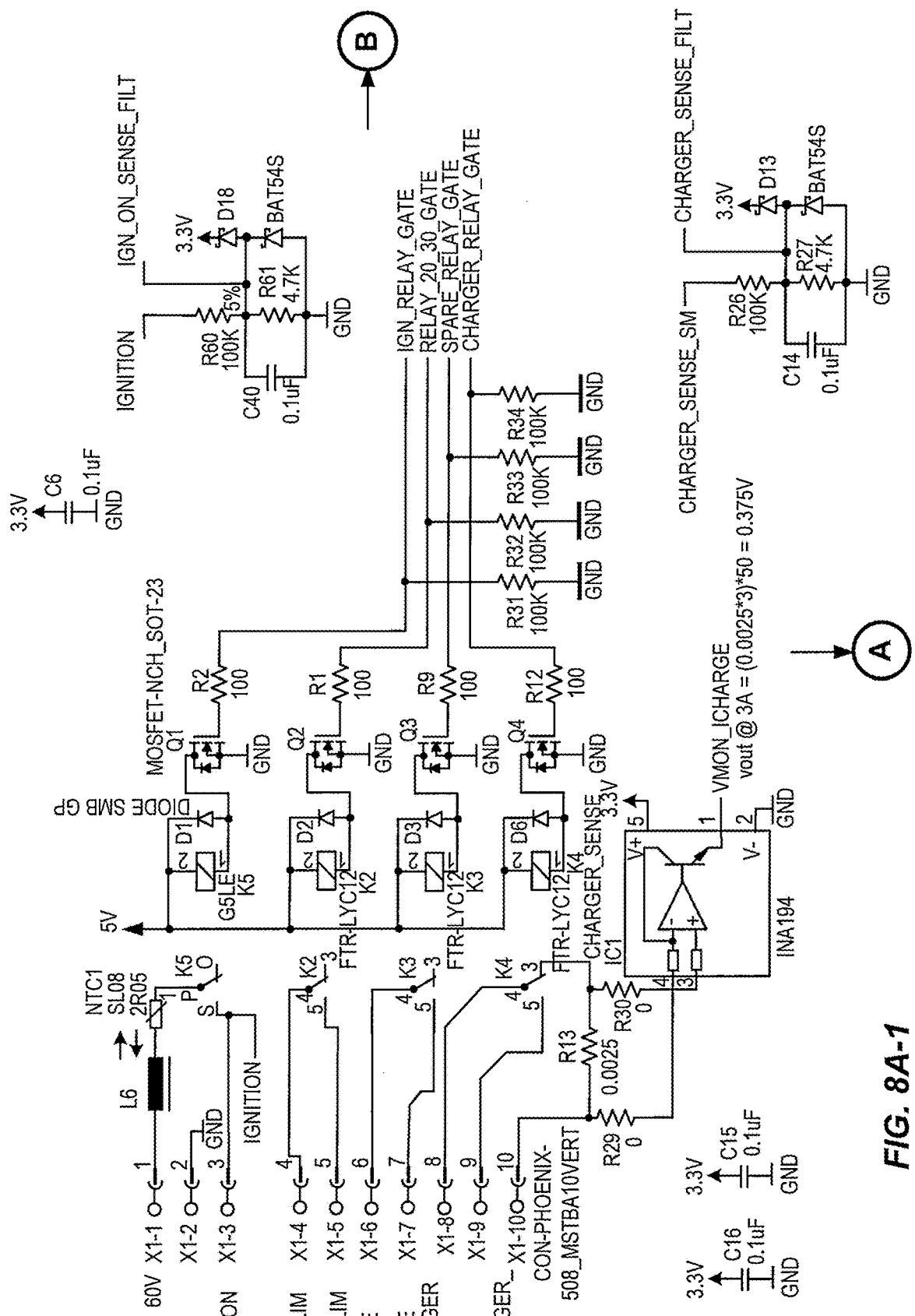
FIGS. 8A-8F show circuit diagrams of various components of an example integrated circuit of an electronic control unit for use with a vehicle.
Figures 2, 8A:
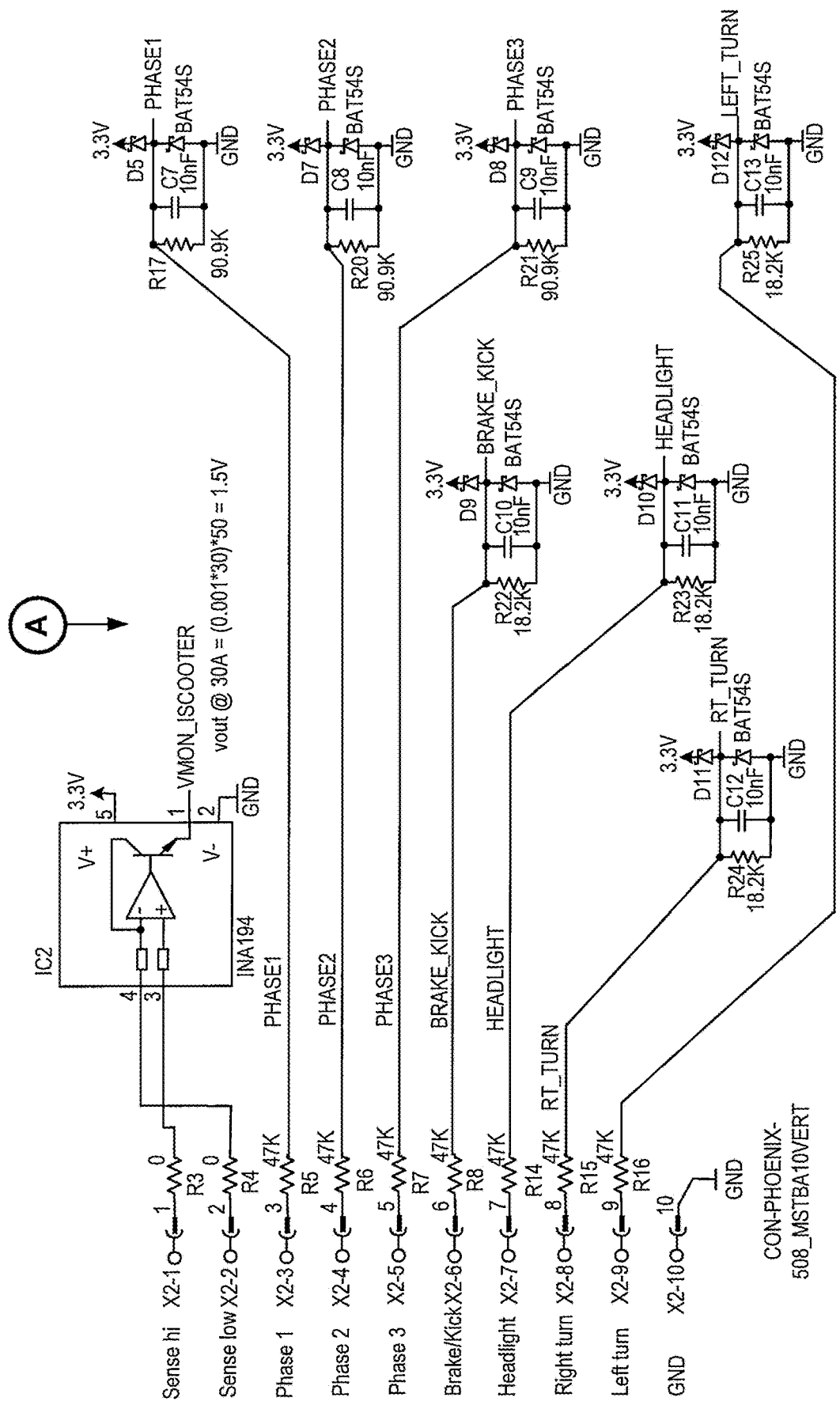
Figures 3, 8A:
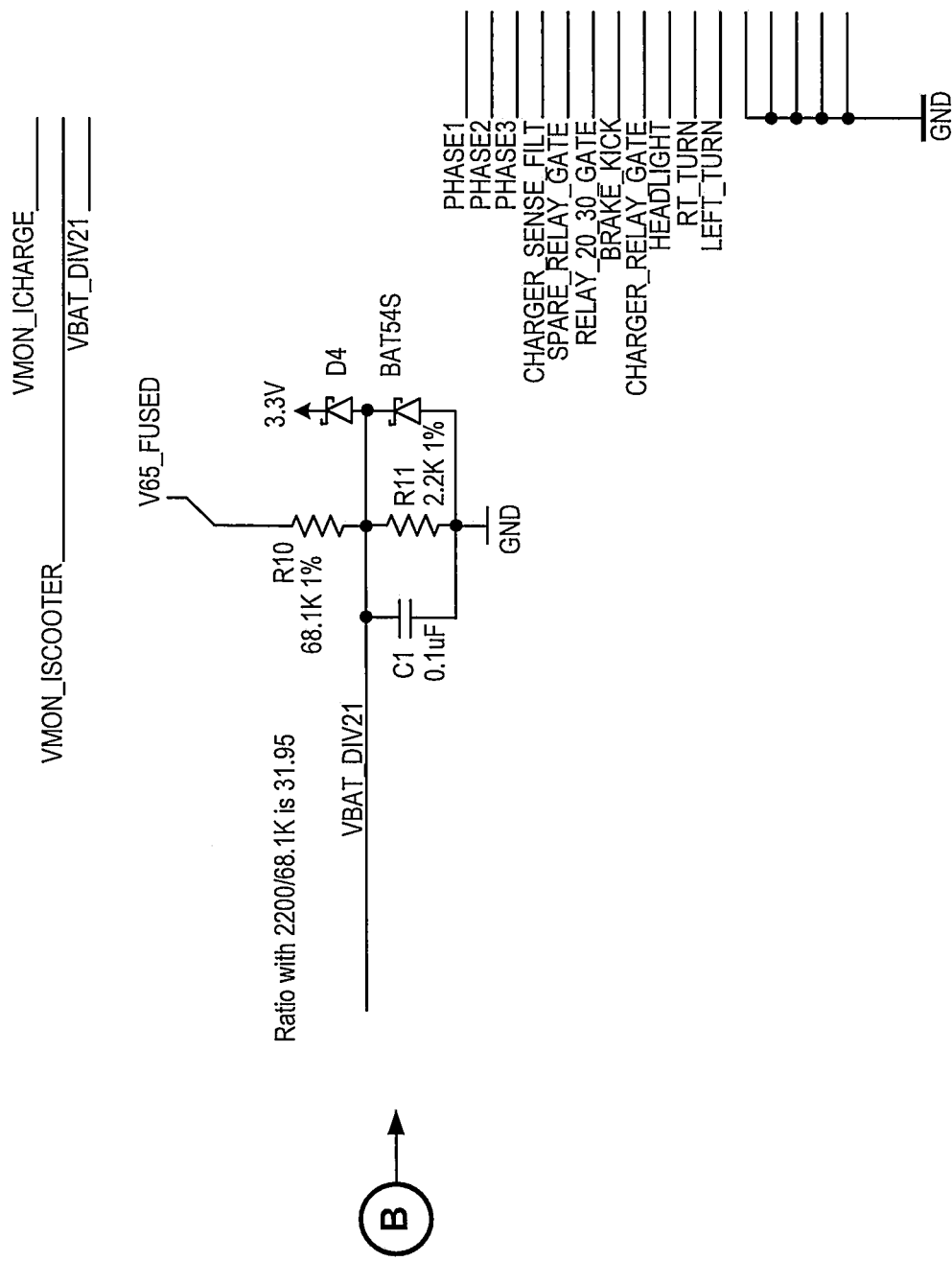
Figures 1, 8B:
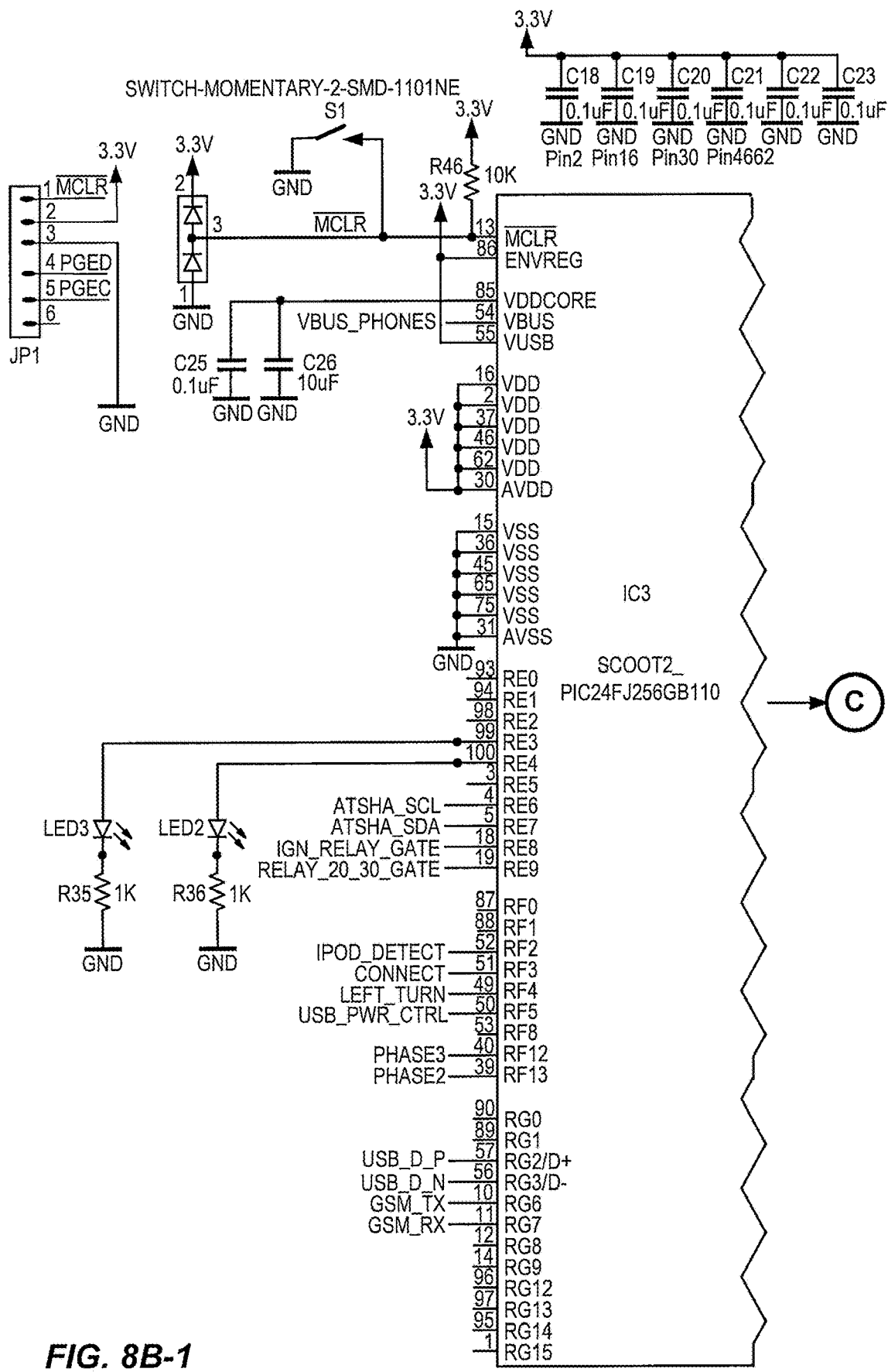
Figures 2, 8B:
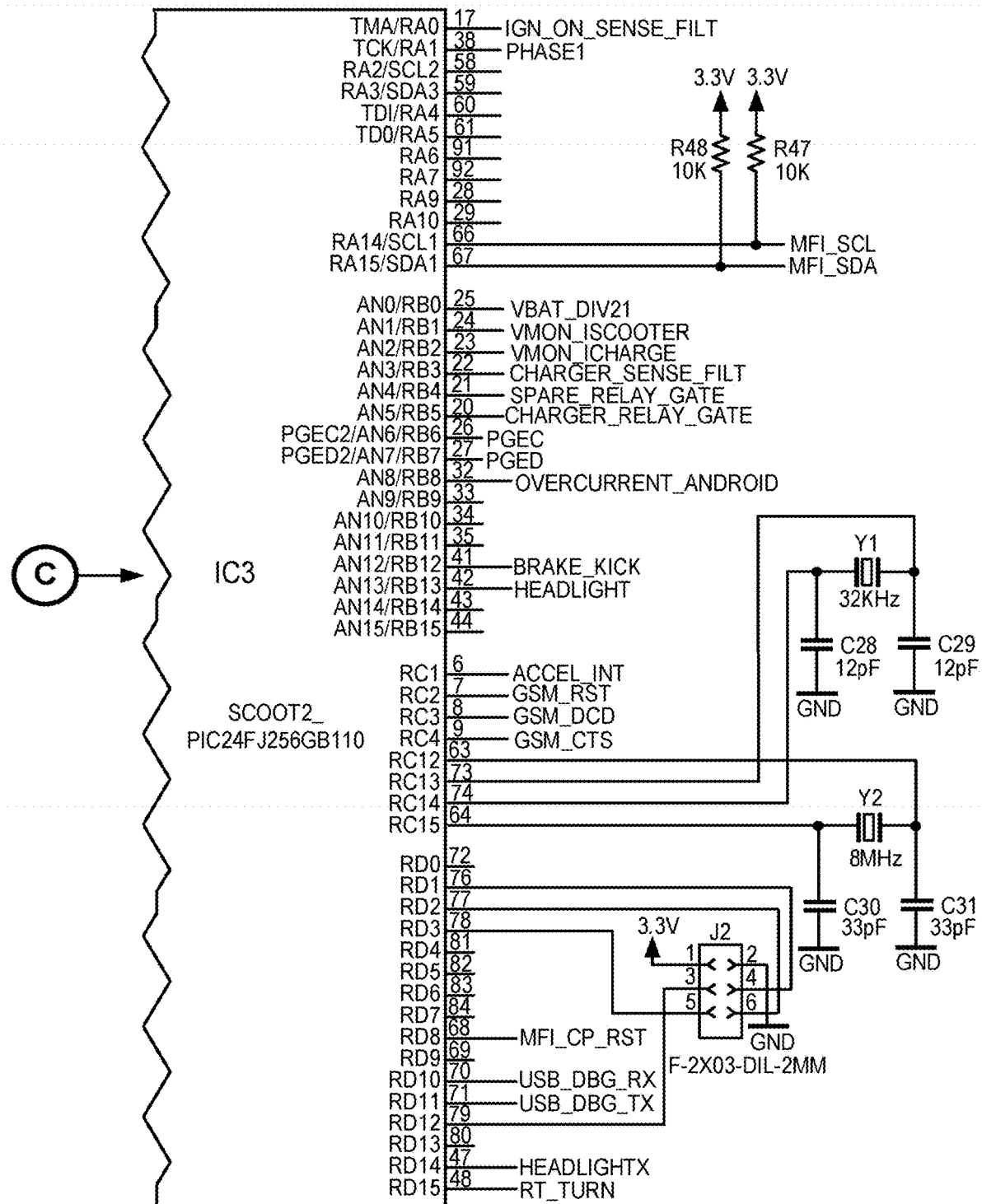
Figure 8C:
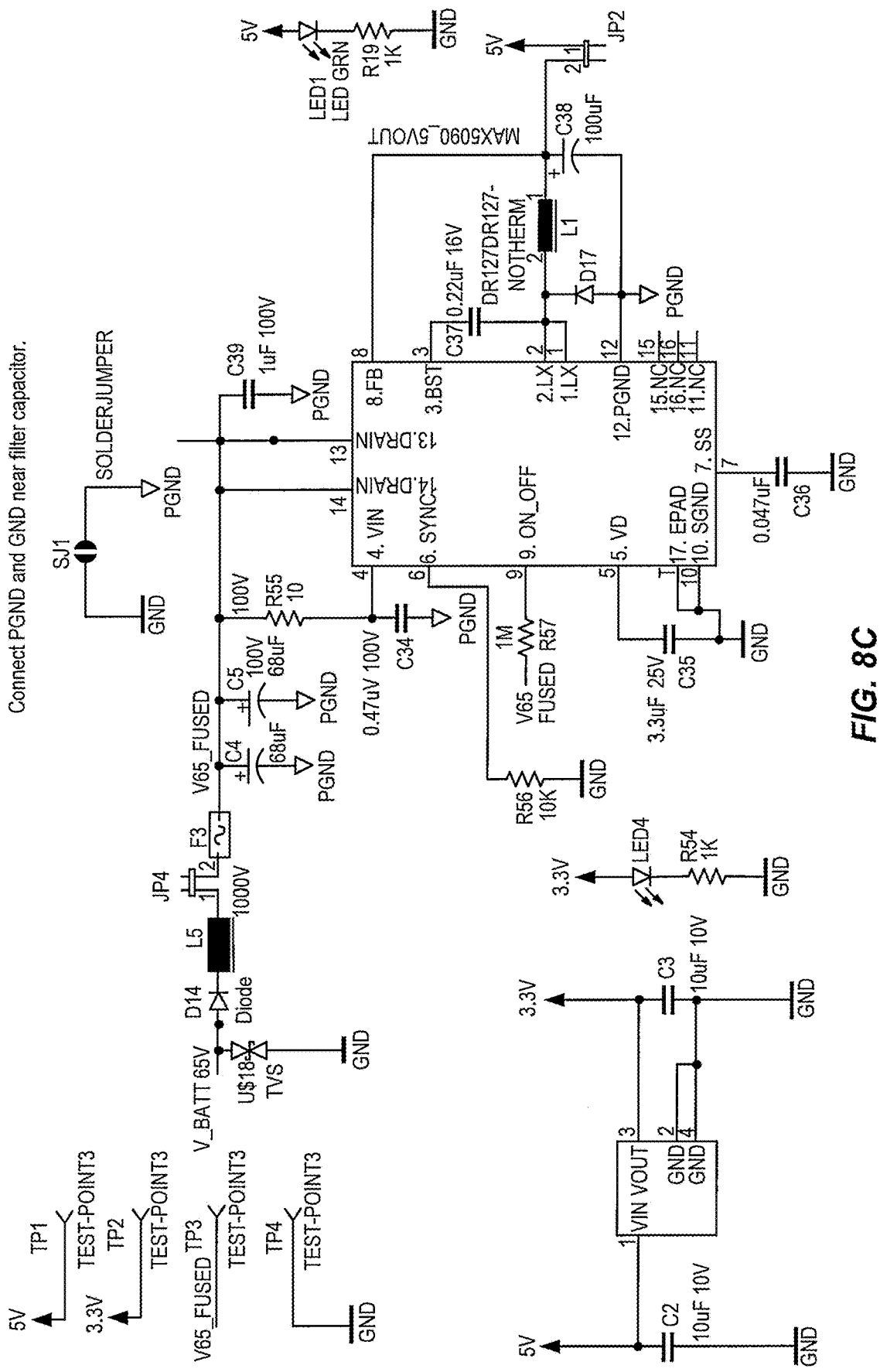
Figure 8D:
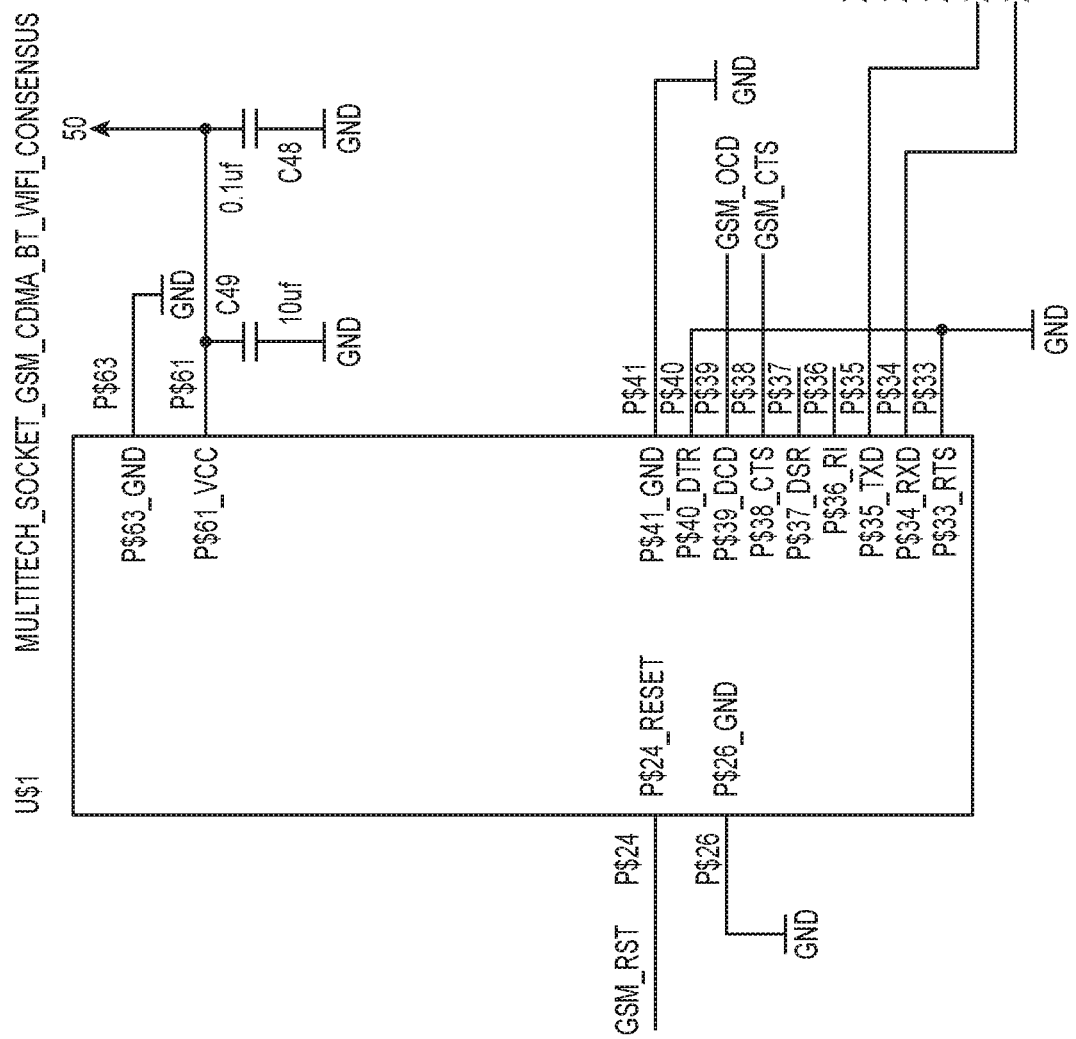
Figure 8E:
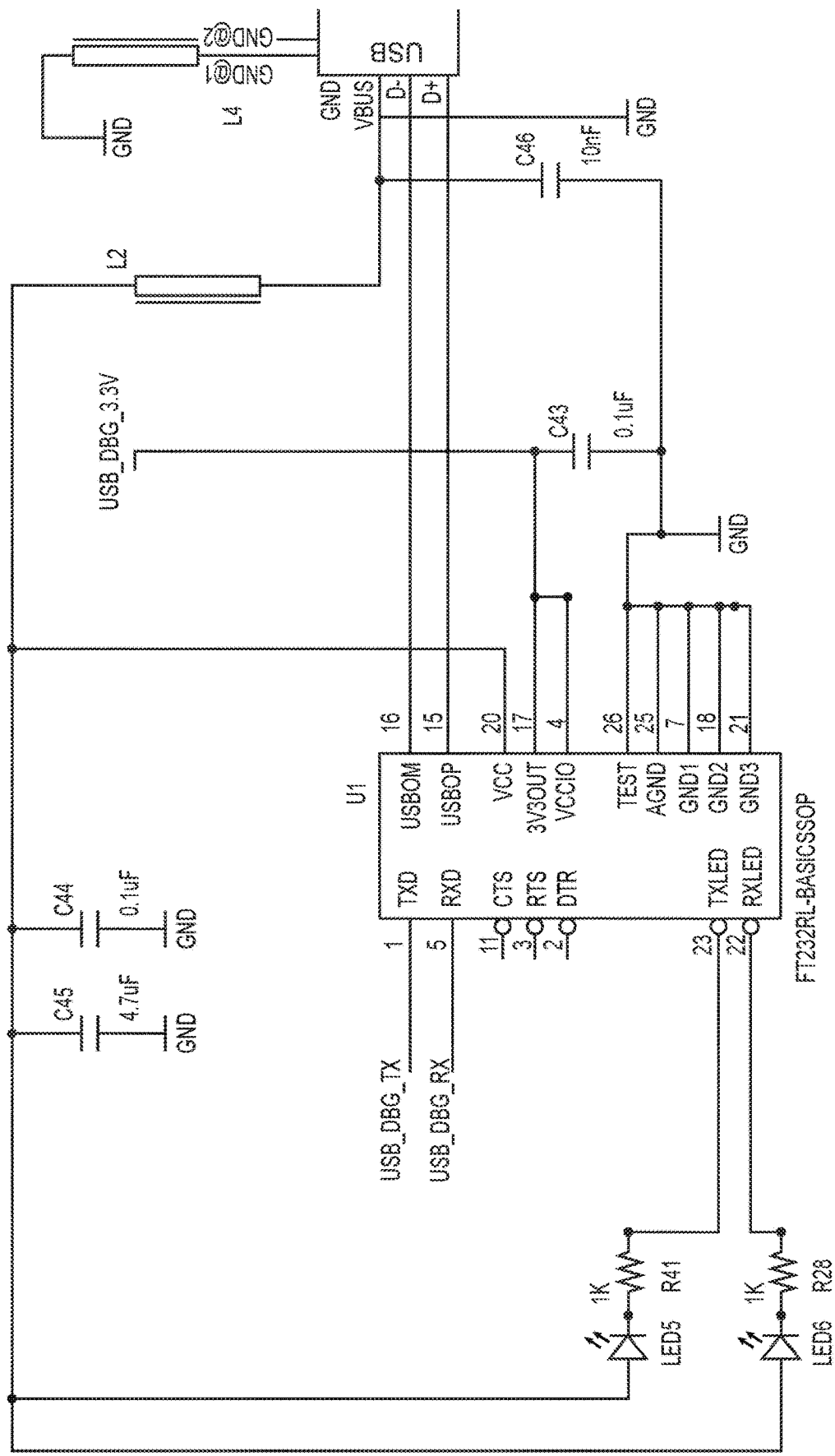
Figure 8F:
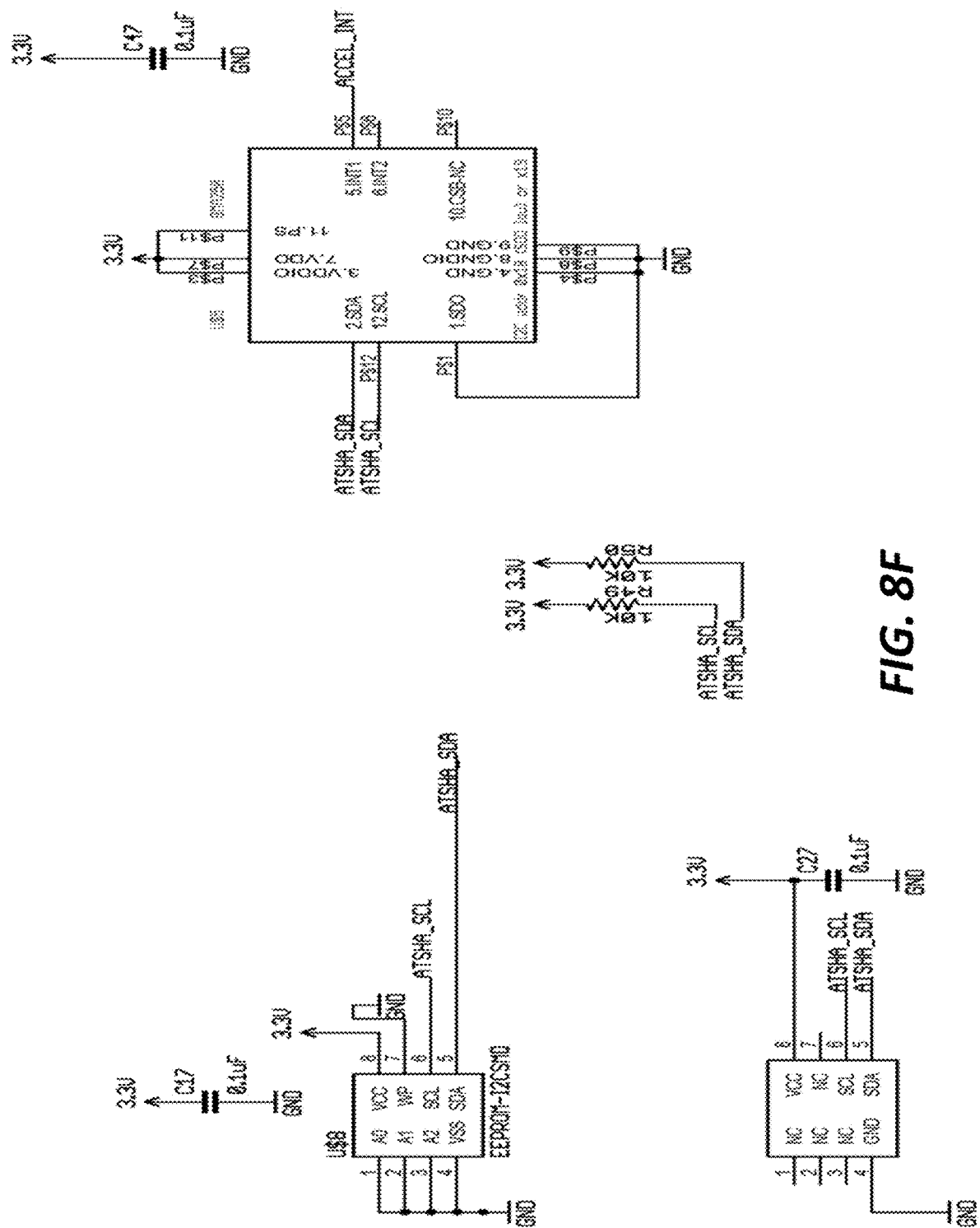

FIGS. 8A-8F show circuit diagrams of various components of an example integrated circuit, as may be used with electronic control units of the disclosure, such as the control unit 700 of FIG. 7. FIG. 8A is a circuit diagram of vehicle interface circuitry. FIG. 8B is a circuit diagram of a processor, such as the processor 710 of FIG. 7. FIG. 8C is a circuit diagram of switching power supply. FIG. 8D is a circuit diagram of a wireless communications module. FIG. 8E is a circuit diagram of serial communications module. FIG. 8F is a circuit diagram of Electrically Erasable Programmable Read-Only Memory (EEPROM), encryption processor and accelerometer.

Features and Functionalities

Systems and methods of the disclosure can provide for various features and functionalities. For example, a system for permitting vehicle access, such as the system 200 of FIG. 2, can allow use of a vehicle by users with different skills or different credentials, such as insurance, license, experience, or system membership type. The system can be adapted to comply with various regulations, such as speed limits. The system can be adapted to permit a given speed at a first location and another speed (e.g., maximum speed) at another location. In some cases, the system can regulate speed based on a skill level of a user (e.g., beginner, intermediate, advanced), as well as regulate horse power or power output, or geographic limits of operation. The system can be adapted to permit a user to carry a passenger.

In some cases, the system can help a user locate a vehicle of the user. This may be implemented, for example, with the aid of a GPS module of an electronic device of the user and software installed thereon.

During pickup of a vehicle by a user, the system can indicate to the user which vehicle among a group of vehicles has been reserved by the user. In an example, the system (e.g., server 201) can direct the vehicle to flash the vehicle's light on or off, or provide other visual and/or auditory signal. In some cases, a reserved vehicle (e.g., scooter) can be directed to "greet" a user who has reserved the vehicle by flashing the lights or tooting a horn of the vehicle when the user is in proximity of within a given distance from the vehicle, such as, for example, if the user is within about 0.01 miles, 0.05 miles, 0.1 miles, 0.15 miles, or 0.2 miles from the vehicle. A greet may aid the user to locate the vehicle. In some cases, the vehicle can be directed to greet the user if the server determines that the user is approaching the vehicle, which determination may be made by measuring or calculating a geolocation of the user at various points in time and, in some cases, generating a trajectory and acceleration of the user towards the vehicle. In some examples, the greet can be specific to a user, as may be prepared by the user and stored in a profile of the user on the server. For example, a first user may have a greet that includes three successive flashes, with individual flashes being one second apart, and a second user may have a greet that includes five successive flashes, with individual flashes being 0.5 seconds apart.

An electronic device of a user, such as the electronic device 510 of FIG. 5, may be used to access various vehicle features. For example, the vehicle can include an electromechanical steering column lock and/or wheel lock that may be enabled and disabled by an application ("app") on the electronic device of the user or the server (e.g., server 201 of FIG. 2). In other examples, the vehicle can include one or more storage units or compartments (e.g., helmet compartment) that can be locked or unlocked using the app.

The electronic device of the user can provide various features during vehicle use. For instance, if the electronic device of the user loses connectivity to a server (e.g., the server 201 of FIG. 2), such as if the electronic device does not have network connectivity, the electronic device may store vehicle use information (e.g., distance traveled, time traveled, emissions information, cost for use, etc.) in a memory location of the electronic device, and provide the stored vehicle use information to the server (e.g., the server 201 of FIG. 2) when the electronic device has regained connectivity to the server. Alternatively, information stored on the electronic device may be provided to the electronic control unit of the vehicle, which may subsequently direct the vehicle use information to the server.

Vehicle electronic control units and/or servers of the disclosure may be configured (e.g., programmed) to estimate the range of a vehicle based on various user-specific factors, such as the weight and/or riding history or behavior of the user, or route planned or previously taken by the user, including a topography of such a route. The range can be represented on a map of a GUI of an electronic device of the user or the vehicle. The range can be depicted, for example, with a shaded circle centered on the location of the user. The server can anticipate future reservations and related energy needs, and adjust interim vehicle availability accordingly, such that sufficient time is available for charging to meet anticipated energy needs. The server can provide the user a warning if the range of the user is dropping below a point in which the user will not be able to predictably reach a nearest charging station.

Vehicles of the present disclosure, as well as components of such vehicles, can be tracked or monitored. This can provide for enabling safety features and functionalities, such as determining whether a user is wearing a helmet or other safety device (e.g., seat belt) when the user has mounted a vehicle, such as a scooter.

Vehicles and components (or elements) of or associated with the vehicles (e.g., helmets) can be tracked using electronic tracking systems or devices associated with electronic control units of the vehicles. In some embodiments, a vehicle (e.g., motorcycle, scooter) has an electronic control unit that regulates vehicle use and access, and further tracks the location of the vehicle and various components of the vehicle. The electronic control unit can be in communication with various sensors for enabling tracking. Examples of sensors include wireless sensors, such as, for example, a Radio-frequency identification (RFID) tag, a weight sensor, a temperature sensor, or a combination thereof. In some examples, RFID tags are used to track assets on a vehicle, such as, for example, a helmet and removable batteries. The can permit the electronic control unit to know whether a given asset being tracked or monitored is in, on, or in proximity to the vehicle. In some instances, this prevents the user from operating the vehicle without the asset. For example, if the electronic control unit does not detect a helmet (e.g., in the vehicle or at a location that is determined to be likely or most likely on the head of the user), then the electronic control unit does not permit the user to operate the vehicle. In such a case, the user may not be able to turn on the vehicle until the electronic control unit detects the helmet.

In some cases, an RFID sensor can operate at multiple ranges, and detection at various ranges provides information that may be relevant to a state of the vehicle, an element of the vehicle, or the user. For example, with a helmet containing an RFID tag, a radiofrequency signal detected by the electronic control unit of the vehicle at a given distance may be indicative of the user wearing the helmet or not wearing the helmet, which may enable the electronic control unit to regulate vehicle access. Thus, based on a radiofrequency signal received from an RFID tag (or sensor), the electronic control unit may know spatially where the helmet is with respect to the scooter.

As an alternative, a helmet can include a temperature sensor. A rise or relatively sudden rise in temperature detected by the helmet may be indicative of the user wearing the helmet. A decrease or relatively sudden decrease in the temperature may be indicative of the user having removed the helmet from the head of the user. This can permit the electronic control unit to regulate vehicle use.

Wireless sensors can be used to track or identify a vehicle beyond a range permissible by other location systems, such as GPS. The location of a vehicle, asset associated with the vehicle, or user can be determined by sensing an RFID tag on the vehicle, asset or user with the aid of RFID sensors at a given location. For example, an RFID tag on a vehicle can be used to detect the location of the vehicle in an parking enclosure using one or more RFID sensors in the parking enclosure.

A wireless sensor can be used to activate or deactivate a vehicle. For example, an RFID tag on a mobile device of a user can be used to activate or deactivate the vehicle if or when the RFID tag is detected by a radiofrequency (RF)

detector (or reader) of the vehicle. The radiofrequency detector can be integrated with an electronic control unit of the vehicle, or separate from the electronic control unit but in communication with the electronic control unit. In an example, the electronic control unit of a scooter allows a user to operate the scooter if the electronic control unit detects an RFID tag (e.g., if the RFID tag is interrogated by the RF reader).

As an alternative to RFID tags, the WiFi or Bluetooth signals from a mobile device can be used to activate or deactivate a vehicle. In an example, a mobile device of a user emits a WiFi signal that is detected by a wireless receiver (e.g., ultrawideband or narrowband receiver) of the electronic control unit. The electronic control unit, upon detecting the WiFi signal, permits vehicle access and/or operation by the user.

In some situations, a numeric keypad is used to activate a vehicle when the vehicle is not in communication range with a remote computer system that regulates vehicle access. The numeric keypad can be coupled to an electronic control unit of the vehicle. The electronic control unit can permit vehicle access if the user inputs the proper code into the keypad. The code can be, for example, a rotating pseudo-random code whose sequence is synchronized with the remote computer system when the vehicle is online or in range. This code can be given to the user by the remote computer system via an application (app) on a mobile device of the user.

Methods and systems of the present disclosure can be used to provide one-way vehicle trips. A user can reserve a vehicle (e.g., scooter) using, for example, a mobile device of the user, such as a Smart phone. The mobile device can include an app that enables the user to interact with a remote computer system to reserve the vehicle. The user can also reserve a destination parking location on the mobile device. For example, on the mobile device, the user selects a vehicle for pick up at a first location (e.g., the corner of Townsend St. and $4^{th}$ St.) and selects a second location (e.g., the corner of $18^{th}$ St. and Mission St.) to park the vehicle. The second location can be a parking spot, such as a dedicated parking spot. The reservation can be finalized in the remote computer system, which reserves the vehicle and the second location for the user, in some cases for a given period of time (e.g., reservation is kept for 15 minutes). The remote computer system may not permit another user to reserve the vehicle or the second location while the vehicle and the second location are reserved by the first user. In some situations, if a second user attempts to park a vehicle in the second location, the second user receives a notification or warning on an electronic display of a mobile device of the second user indicating that the second location has been reserved and is not available to the second user.

EXAMPLES

Systems and methods of the disclosure can be implemented with the aid of an application ("app") on an electronic device (e.g., mobile device) of a user, which electronic device is coupled to a server (e.g., server 201 of FIG. 2) and a vehicle (e.g., scooter). The app can be implemented on a graphical user interface (GUI) on the electronic device of the user.

FIGS. 9-14 show screenshots of a GUI of an app that is programmed to enable a user to find a scooter in a given geographic location, reserve the scooter, use the scooter, and receive various use information during and subsequent to the use of the scooter. The scooter may have an electronic cluster, such as the electronic cluster 501 of FIG. 5, and an electronic control unit as described herein, such as the electronic control unit 700 of FIG. 7.

Although the examples and screenshots and below have been described in the context of scooters, it will be appreciated that the examples and screenshots may apply to other vehicles, such as motorcycles, automobiles, trucks and boats.

Figure 9:
FIG. 9 is a screenshot of an application (app) showing a map in which a user has located a scooter.

In FIG. 9, a user has located a scooter on a map displayed on the GUI of the electronic device of the user. The app may display information about the scooter, for example the battery level or estimated range of the scooter so that the user can choose a scooter with sufficient range for the user's needs. Alternatively, the user may input a destination and the server can direct the user to a scooter that meets the user's needs, such as having a range sufficient to enable the user to reach the user's destination and, in some cases, drive back to the user's starting point. The server can direct the user to the scooter by, for example, providing the location of the scooter on a GUI of the electronic device of the user.

The app may present the user with the opportunity to reserve ("Reserve") a selected scooter. In the illustrated example, the user has selected a scooter ("Scoot 16"), and the app presents the user with the opportunity to reserve Scoot 16.

Figure 10:
FIG. 10 is a screenshot of an app showing the user as having elected to reserve a scooter.
Figure 11:
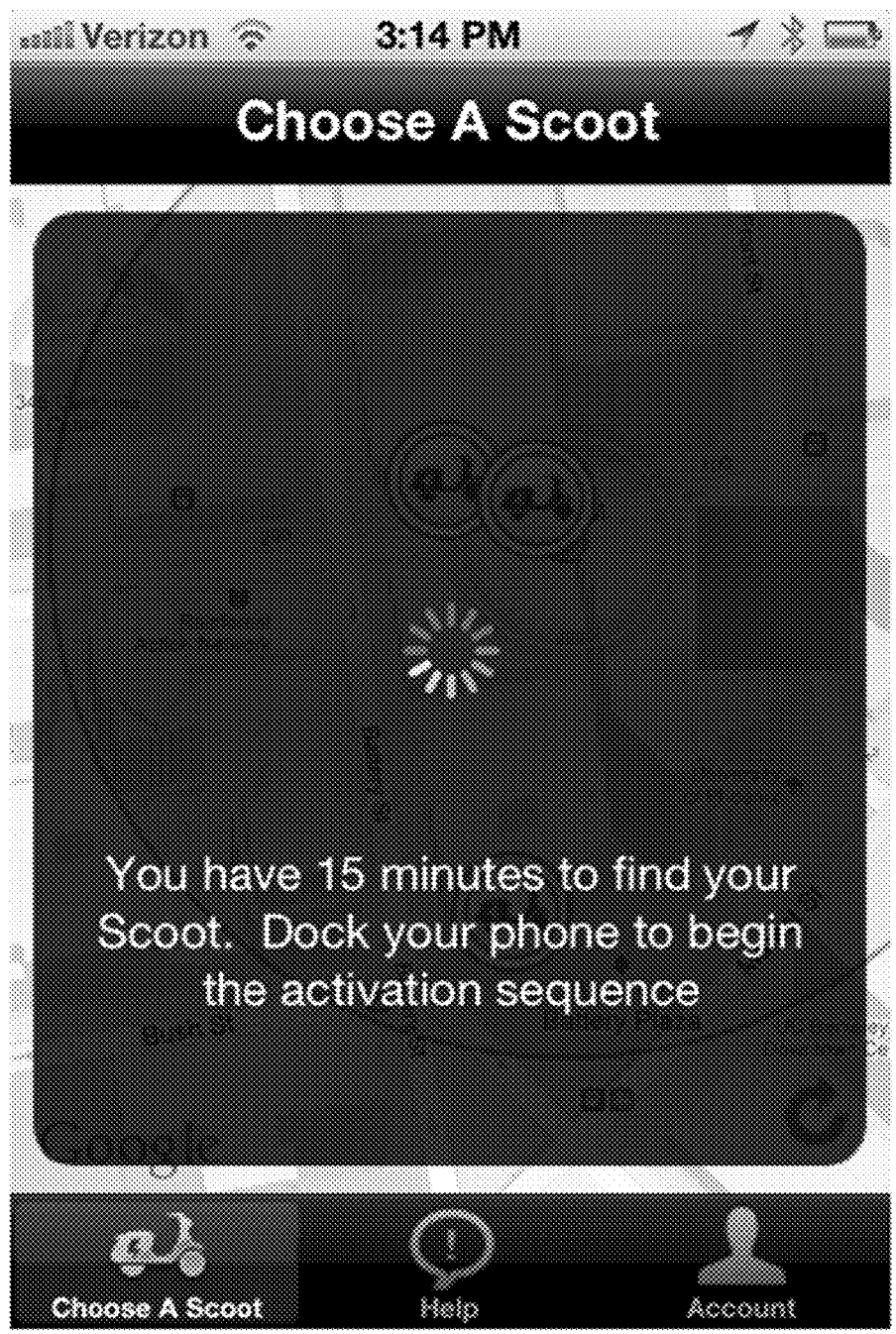
FIG. 11 is a screenshot of an app showing the user as a given time period in which to find and access a reserved scooter.

With reference to FIG. 10, the user has elected to reserve Scoot 16, and the app queries the user to determine whether the user wishes to reserve Scoot 16 ("Reserve Scoot 16 for 15 minutes?"). If the user elects to reserve Scoot 16, then the app instructs the server that the user has elected to reserve Scoot 16. In such a case, the user is provided a time period of 15 minutes to travel to Scoot 16 and couple the electronic device of the user to an electronic control unit of Scoot 16. In FIG. 11, the user has elected to reserve Scoot 16, and the app informs the user that the user has 15 minutes to find Scoot 16 ("You have 15 minutes to find your Scoot. Dock your phone to begin the activation sequence"). However, if the user elects to cancel ("Cancel") the reservation of Scoot 16, then the user is permitted to find another vehicle to reserve.

Figure 12:
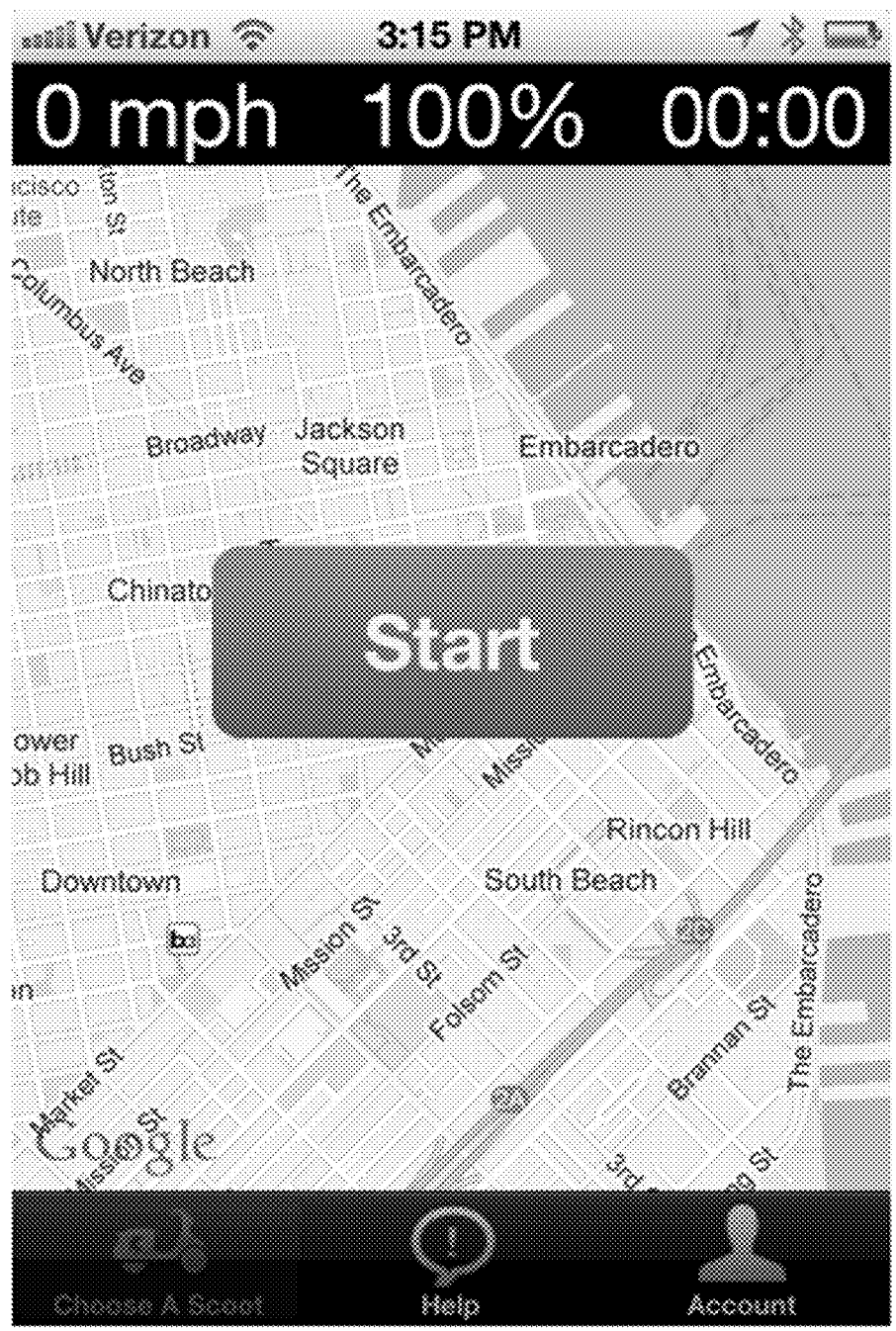
FIG. 12 is a screenshot of an app showing the user as having located a scooter and being presented with the option to start a user period of the scooter.

With reference to FIG. 12, the user has located Scoot 16 and coupled the user's electronic device to the electronic control unit of Scoot 16 (i.e., the user has docked the user's electronic device to Scoot 16). The app then presents the user with a dashboard that shows the speed of Scoot 16 ("0 mph," as illustrated), the percentage of charge remaining in an energy storage device of Scoot 16 ("100%", as illustrated), and a timer that shows the length of time Scoot 16 has been used ("00:00," as illustrated). The app also shows the location of Scoot 16 on a map. A start button ("Start") enables the user to begin using Scoot 16. If the user elects to press or otherwise select the start button, then the user will be permitted to begin driving Scoot 16. Upon pressing the start button, the timer will record the length of time the user has used Scoot 16.

Figure 13:
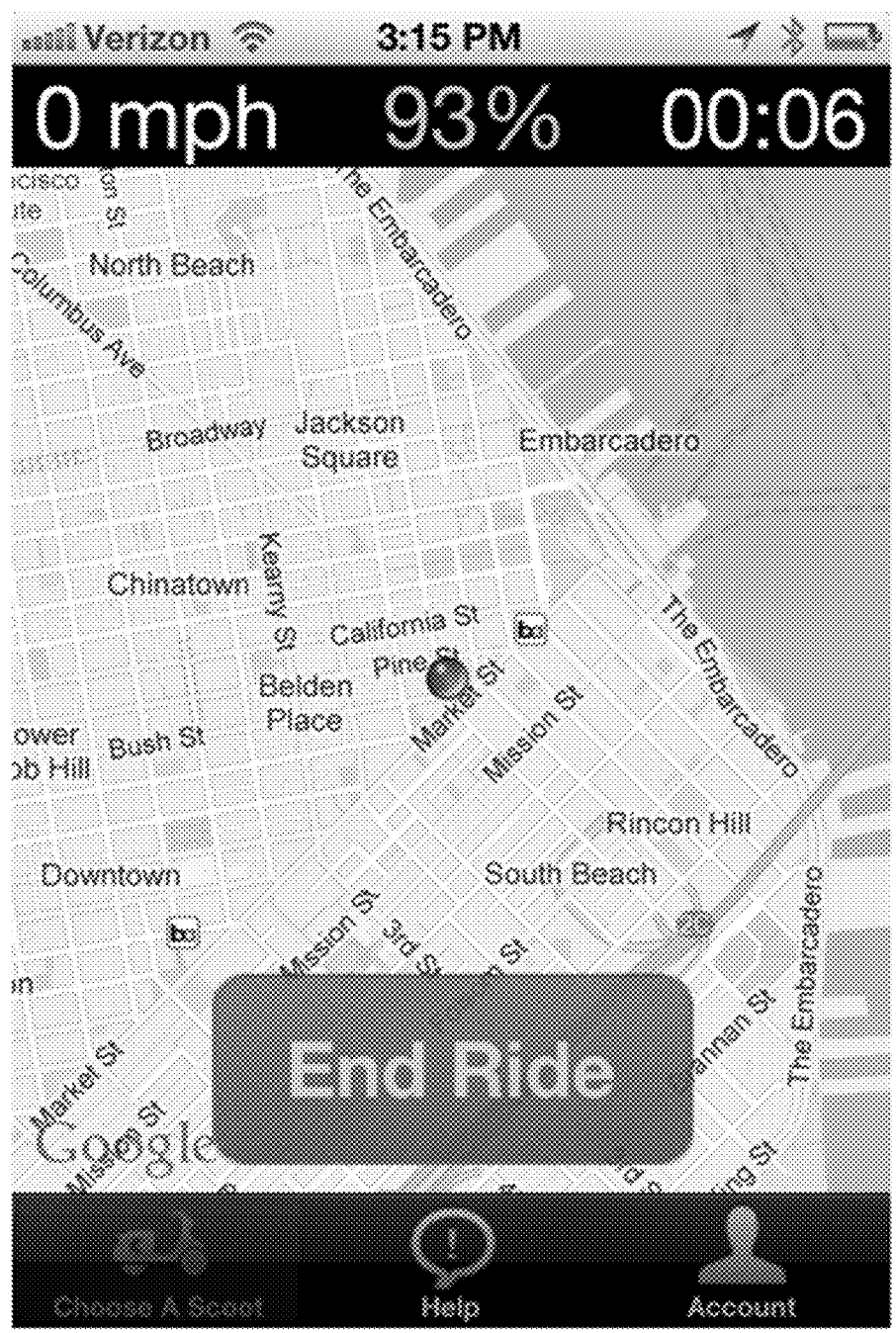
FIG. 13 is a screenshot of an app that presents the user with the option to terminate the use of a scooter that is in use by the user.

With reference to FIG. 13, the app presents the user with the option of terminating the use of Scoot 16 ("End Ride"). The user may be able to elect this option if Scoot 16 is parked or otherwise not moving, and. In some cases, the user is able to elect to terminate the use of Scoot 16 if the lid of a dock of Scoot 16 is open. The user may not be able to terminate the use of Scoot 16 if the lid is closed or if the user is driving Scoot 16. In some examples, the app presents the user with the option to terminate the use of Scoot 16 if the sever or the electronic device of the user determines that Scoot 16 is stationary or parked—e.g., by monitoring a location of Scoot 16 via GPS, or by monitoring scooter movement with the aid of an accelerometer, such as an accelerometer on the electronic device of the user or on an electronic control unit of the scooter.

Figure 14:
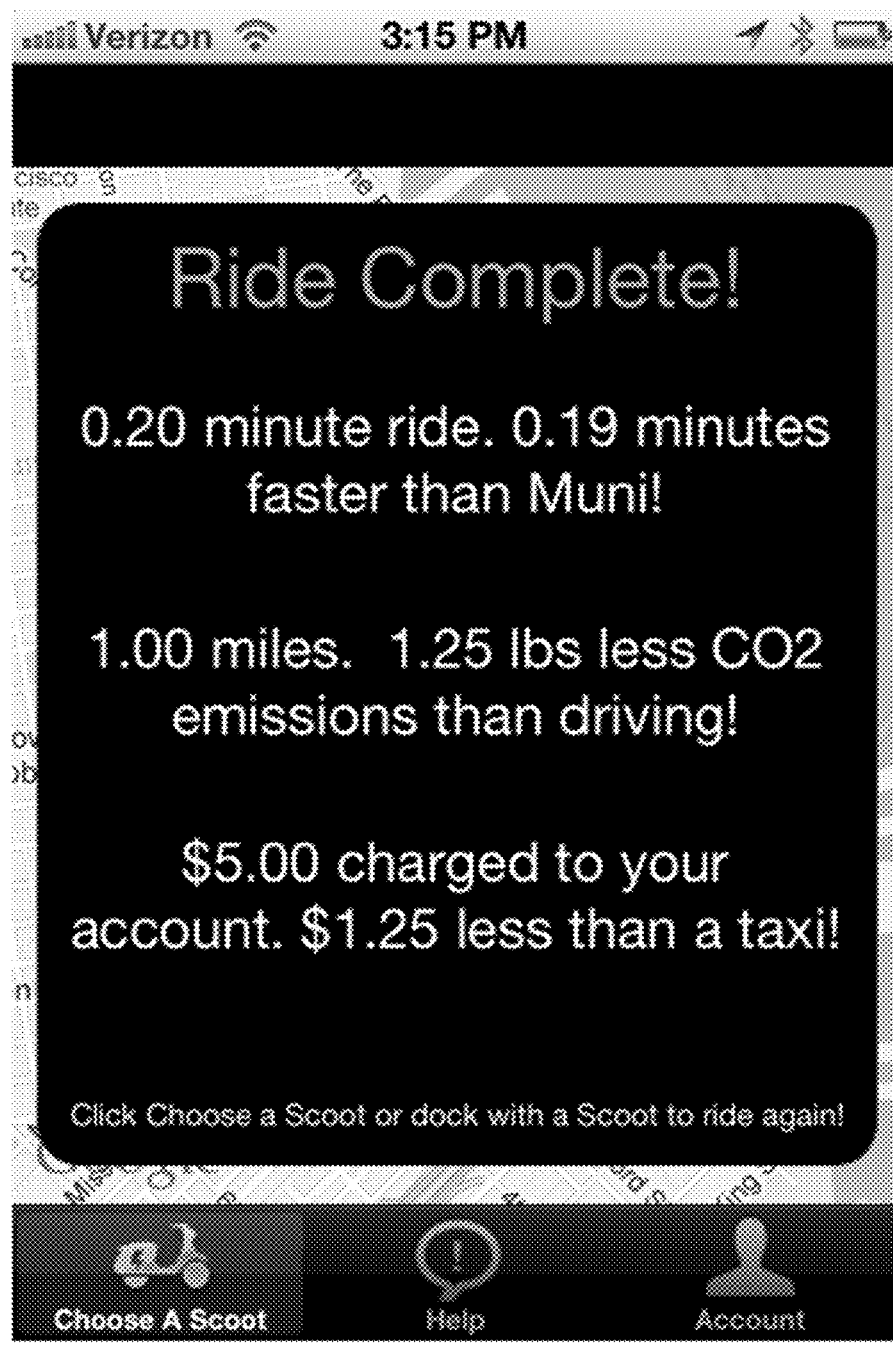
FIG. 14 is a screenshot of an app that shows various use information upon the user having terminated the user of a scooter.

With reference to FIG. 14, when the user has terminated the use of Scoot 16, the app, in some cases upon direction from the server, presents the user with various use information. In the illustrated example, the app presents the length of time the user used Scoot 16 ("0.20 minute ride"), total distance traveled during use ("1.00 miles"), and carbon dioxide emissions saved for using Scoot 16 ("1.25 lb less CO2 emissions than driving!"). The app also shows the total cost for using Scoot 16 ("$5.00 charged to your account"), and savings to the user for using Scoot 16 over other modes of transportation ("$1.25 less than a taxi!").

Figure 15:
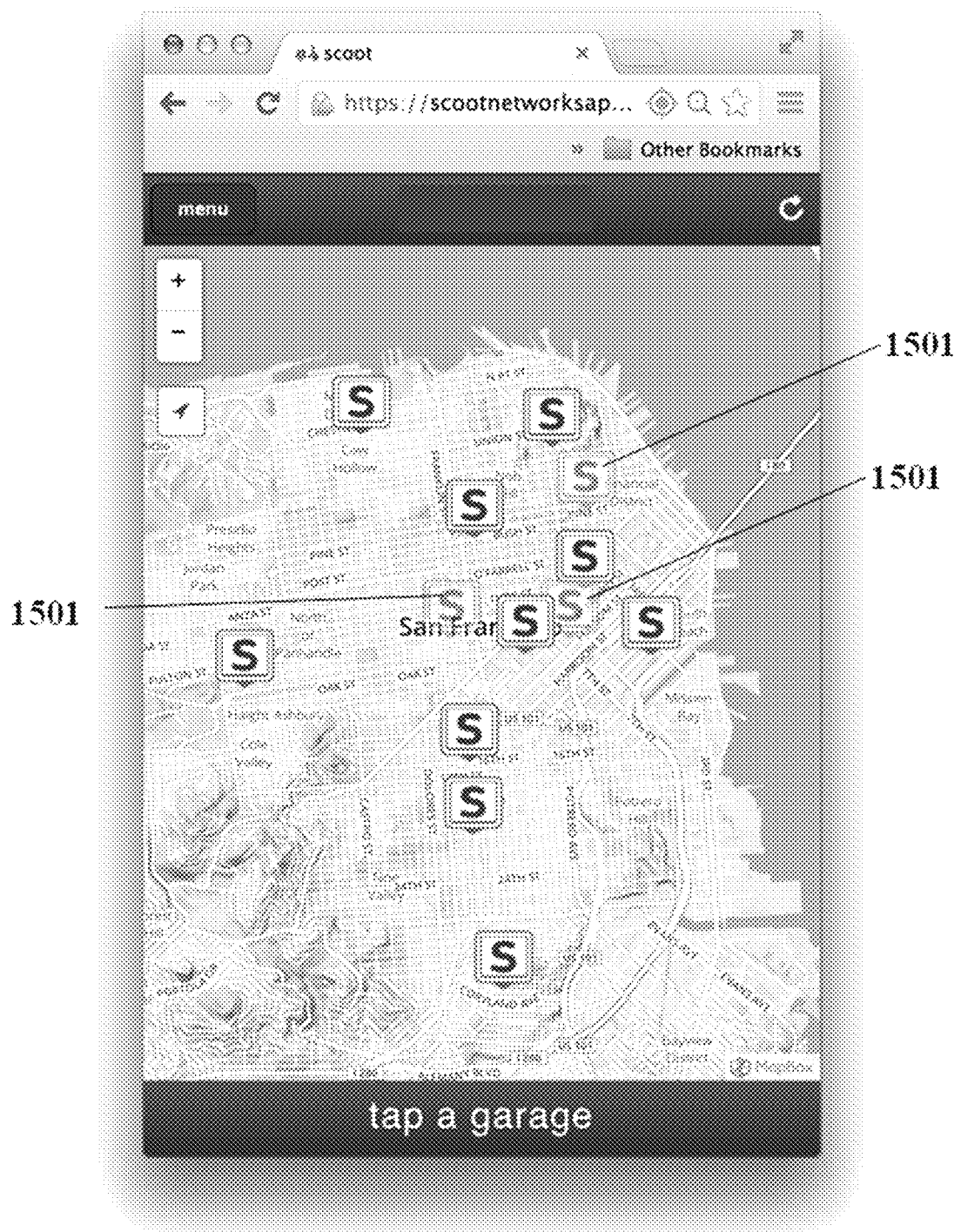
FIG. 15 is a screenshot of an app that shows a map with the locations of various scooters.

FIG. 15 shows an initial scoot discover screen of the app. A map is displayed with icons ("S") that indicate garages with scooters. Icons that are grayed out 1501 indicate garages without available scooters. Scooters are available at other marked garages. Availability is determined on a per-user basis, so two different user may see different garages on the map. Tapping an "S" icon results in scooter icons to be displayed in a radial pattern around the garage, with the garage name and hours of operations (including opening hours) displayed in a grey bar near the bottom.

Figure 16:
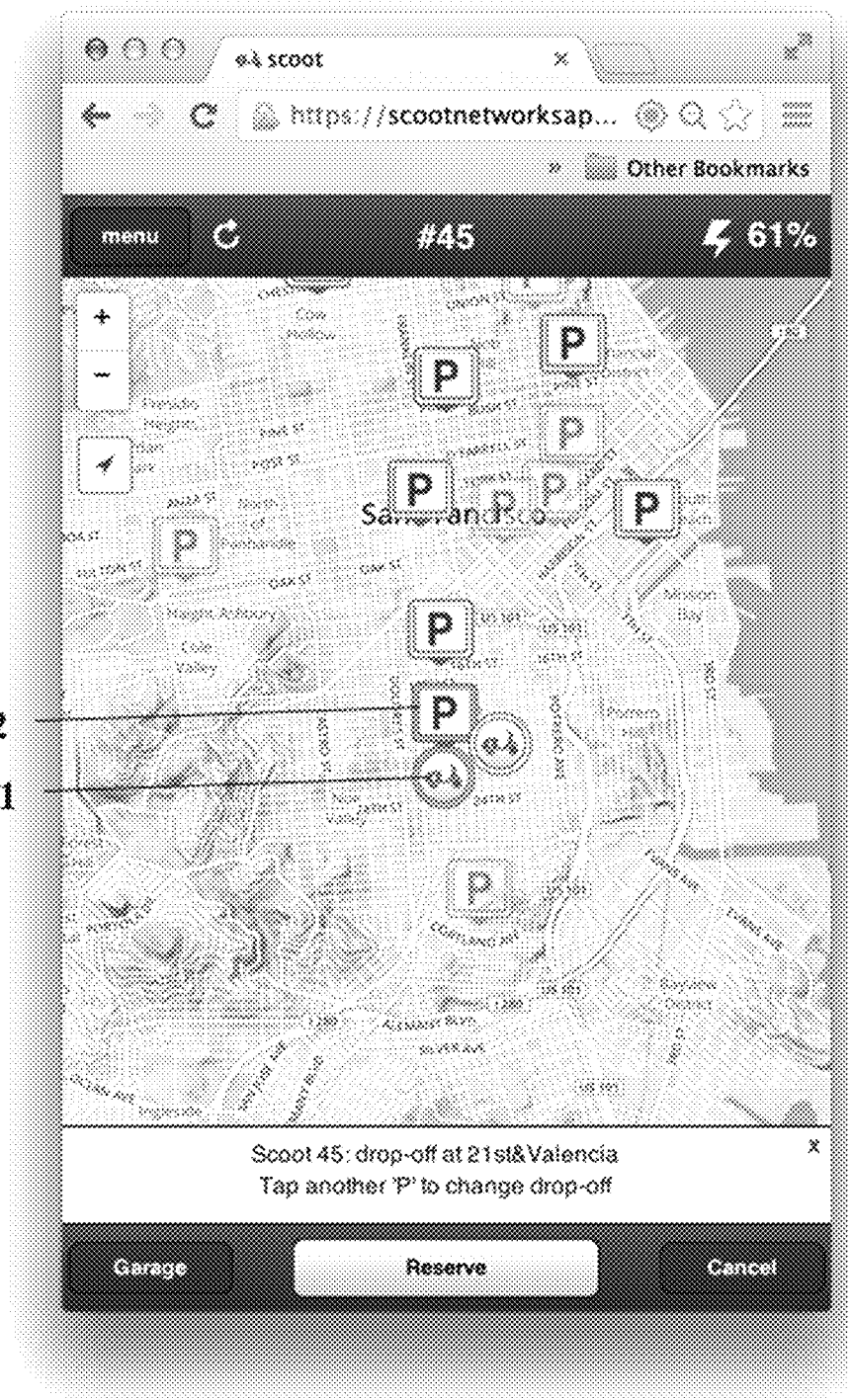
FIG. 16 is a screenshot of an app that shows a map with the locations of various scoters available for pickup and drop-off locations (P)

A user can select a scooter from available scooters and also select a destination location from those that are available, such as destination garages ("P"). FIG. 16 shows an example result of tapping a garage and then tapping a scooter. A scooter number and garage name where a scooter is to be dropped off are displayed towards the bottom of the screen. The scooter number ("Scooter 45" in the illustrated example) and battery charge level ("61%") are displayed in the top bar. The selected scooter 1601 and destination garage 1602 are shown on the map using icon colors that are different from unselected scooters and destination garages. Destination garages that are not available for drop-off may be grayed out, while those that are available are not grayed out. The user can select a destination location by tapping on a destination icon and accepting the confirmation dialog.

Figure 17:
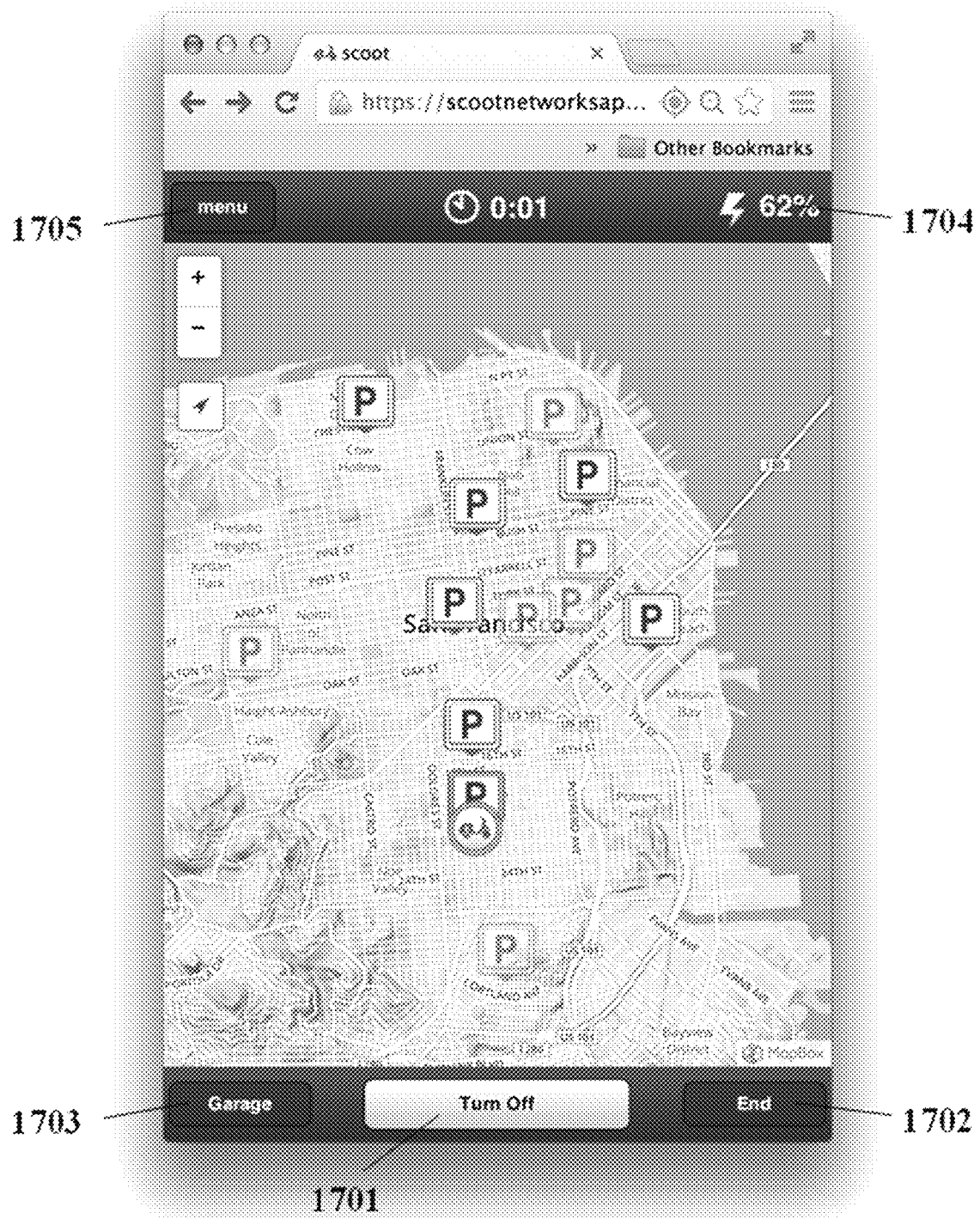
FIG. 17 is a screenshot of an app that shows a map displaying a scooter ride in progress.
Figure 18:
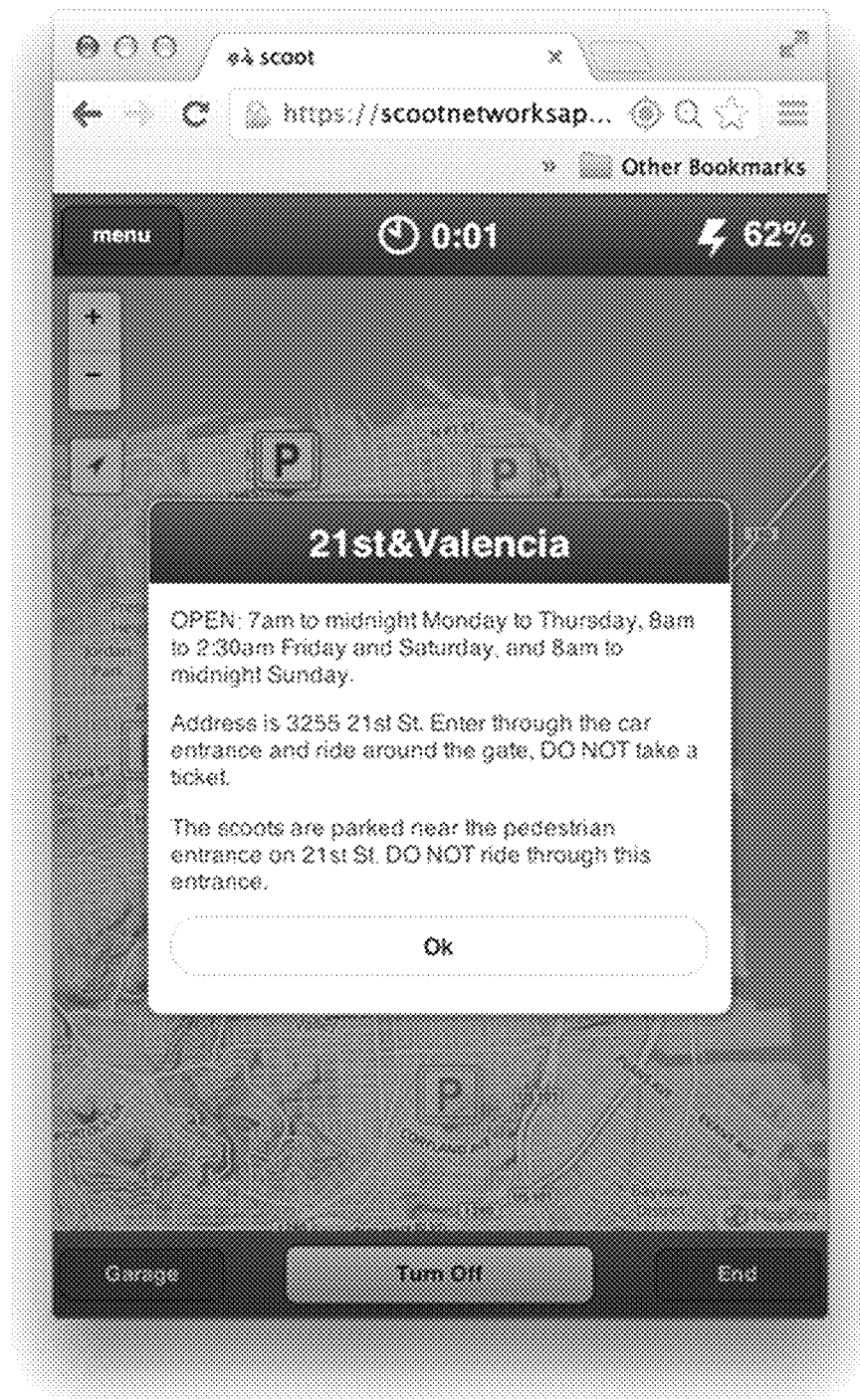
FIG. 18 is a screenshot of an app that shows information on a drop-off location of a scooter.
Figure 19:
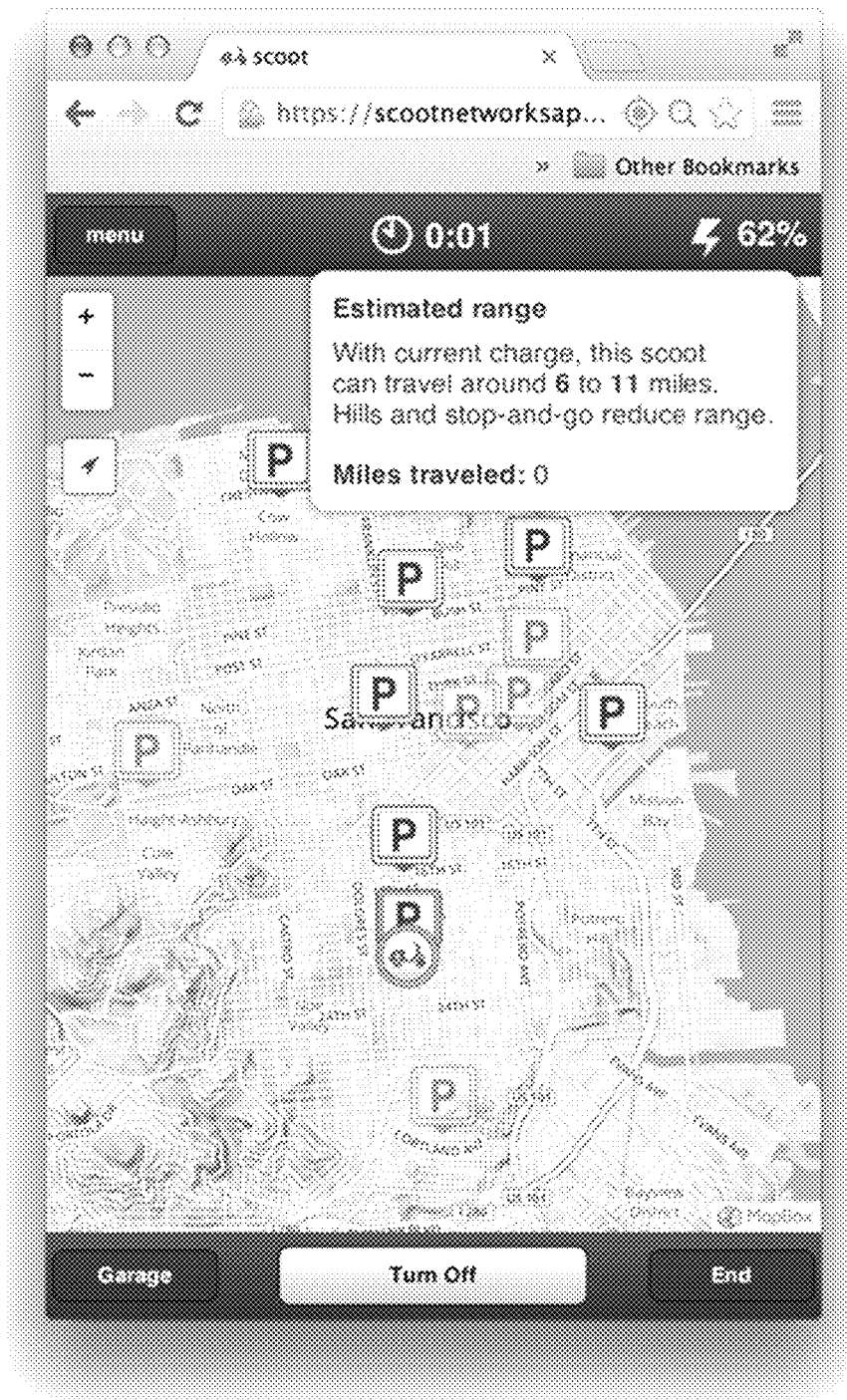
FIG. 19 is a screenshot of an app that shows a map with the estimated range of a scooter and distance covered during use.

FIG. 17 is a screenshot of the app showing a map with scooter ride in progress. The scooter is shown at its GPS reported location, which can be updated to reflect a current geolocation of the scooter. A selected destination (or drop-off) location may be changed at any point on the ride. However, the user may be permitted to change a drop-off location only when the scooter is not in motion, as may be detected by the electronic device of the user (e.g., using an accelerometer of the electronic device to detect motion). A "Turn Off" button 1701 at the bottom of the screen turns off the scooter but keeps the scooter checked out to the user. An "End" button 1702 at the bottom ends the ride, at which point a warning is displayed if the scooter is not at its expected drop-off location. A "Garage" button 1703 provides information about the destination garage. Tapping button 1703 displays the pop-up of FIG. 18 with garage information. Ride duration is displayed at the top and battery level 1704 at the top right. The battery level 1704 enables the user to view the state of charge of the battery of the scooter. Tapping the battery level 1704 displays a dialog with information about expected or projected remaining range and distance covered so far, as shown in FIG. 19.

Figure 20:
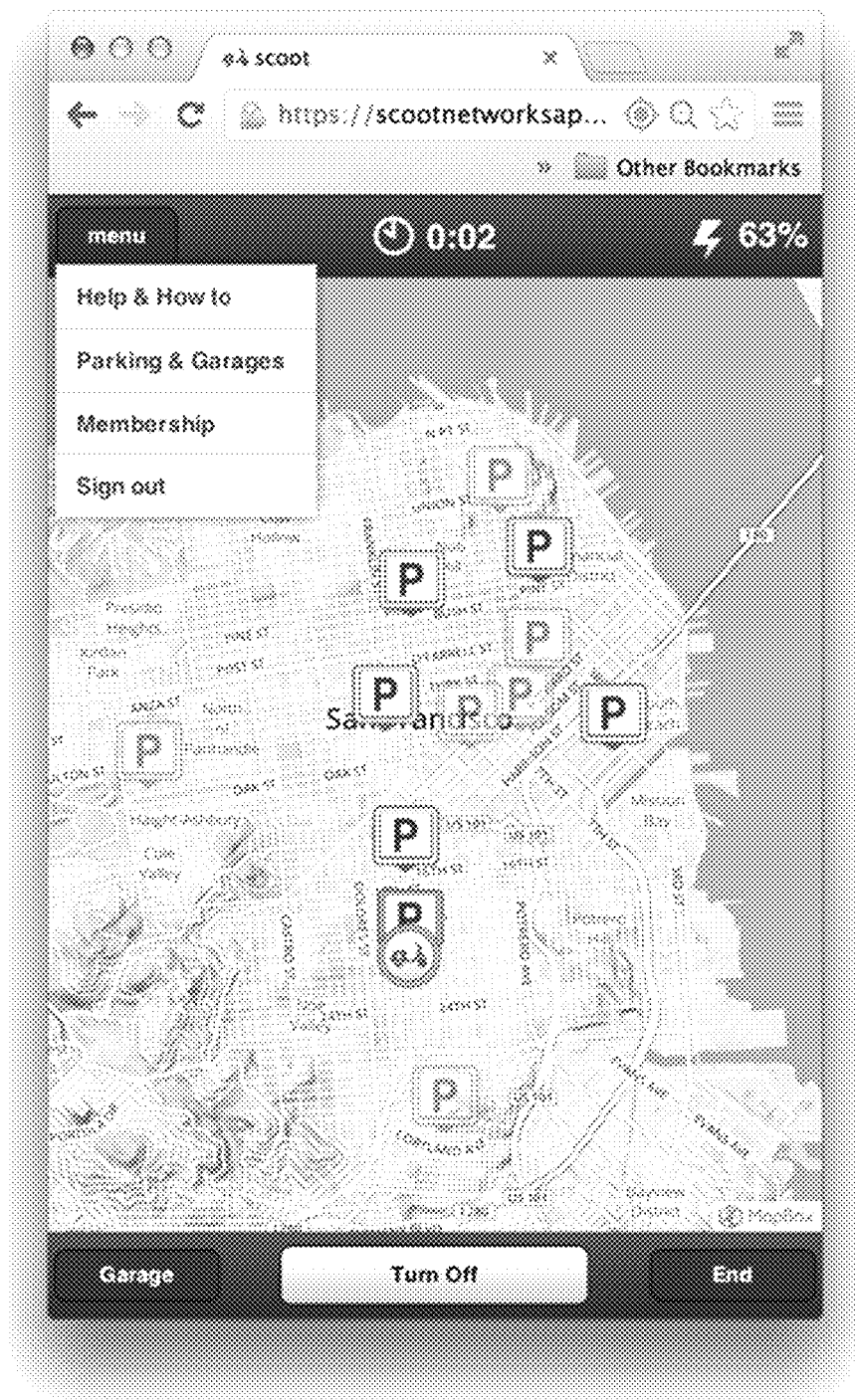
FIG. 20 is a screenshot of an app that shows various menu options.

The app of FIG. 17 also includes a "menu" button 1705. Tapping button 1705 displays the pop-up at the top-left portion of FIG. 20 with various menu features, such as "Help & How to," "Parking & Garages," "Membership," and "Sign out."

Figure 21:
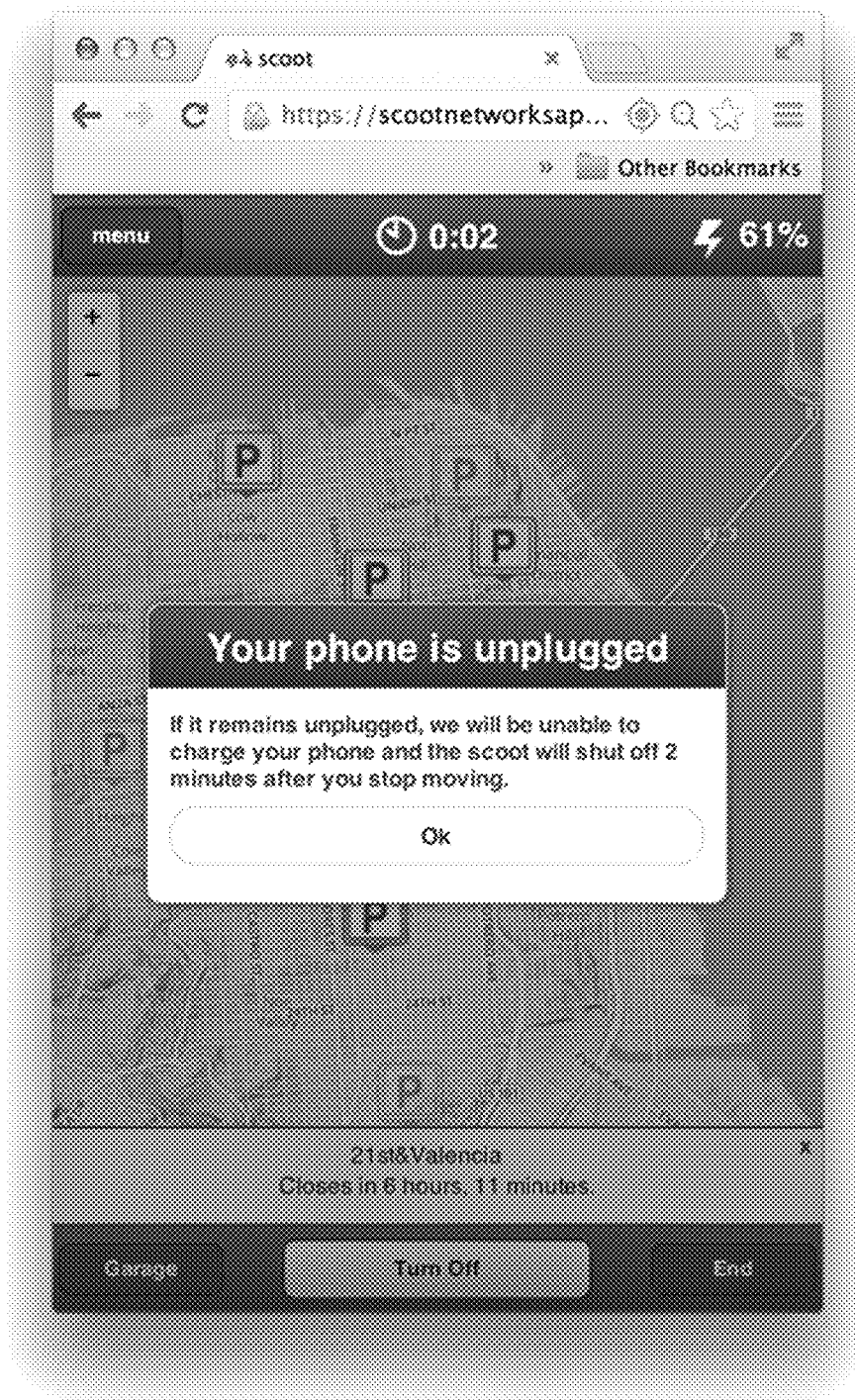
FIG. 21 is a screenshot of an app that shows a notification indicating that a mobile device of a user with the app is not in communication with (e.g., unplugged from) an electronic control system of a scooter.

With reference to FIG. 21, if a scooter is activated and ridden without plugging the scooter's USB cable into the electronic device (e.g., phone) of the user, a warning dialog is displayed. The dialog indicates that if the phone is not plugged into the scooter, then the scooter will shut off two minutes after the scooter stops moving. This feature can help ensure that the user couples the phone (or other appropriate electronic device) to the scooter.

Figure 22:
FIG. 22 is a screenshot of an app with an example in-app tutorial.

The app can provide the user an in-app tutorial, which may guide the user through various features and functionalities of the app and scooter. FIG. 22 shows a tutorial that guides the user through the process of starting the app on a Smart phone of the user, and reserving a scooter.

Figure 23:
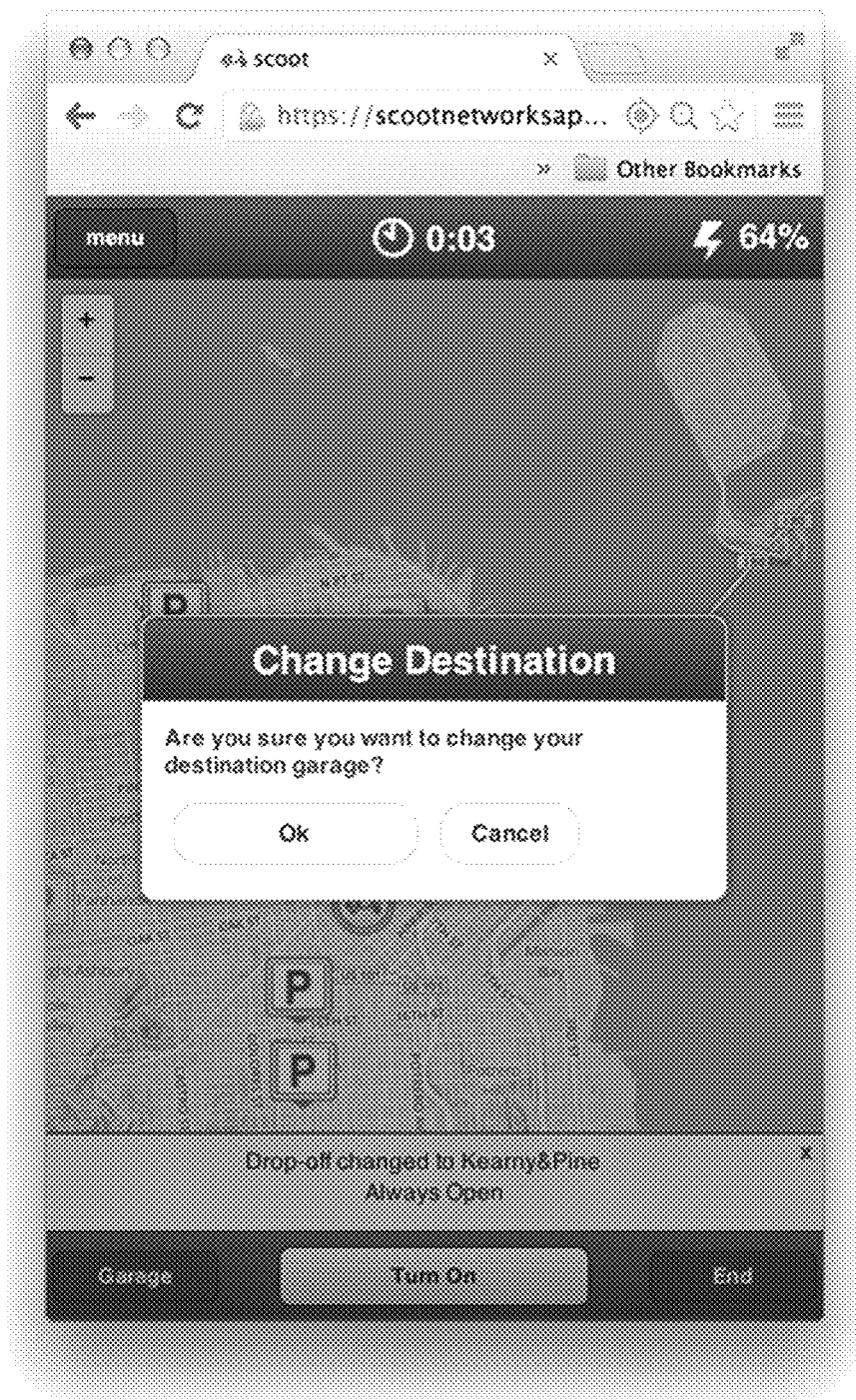
FIG. 23 is a screenshot of an app showing a dialog that is presented when a user selects a new drop-off location.

The user can select a destination (or drop-off) location and change the destination location. FIG. 23 shows a dialog that is presented by the app when the user selects a new drop-off location (e.g., garage). In this example, selecting "OK" will reserve a parking space in the new drop-off location, provided that the new drop-off location has not been taken in the time since the dialog was presented. If parking is no longer available, an apology message is presented with instructions to choose another drop-off location.

Figure 24:
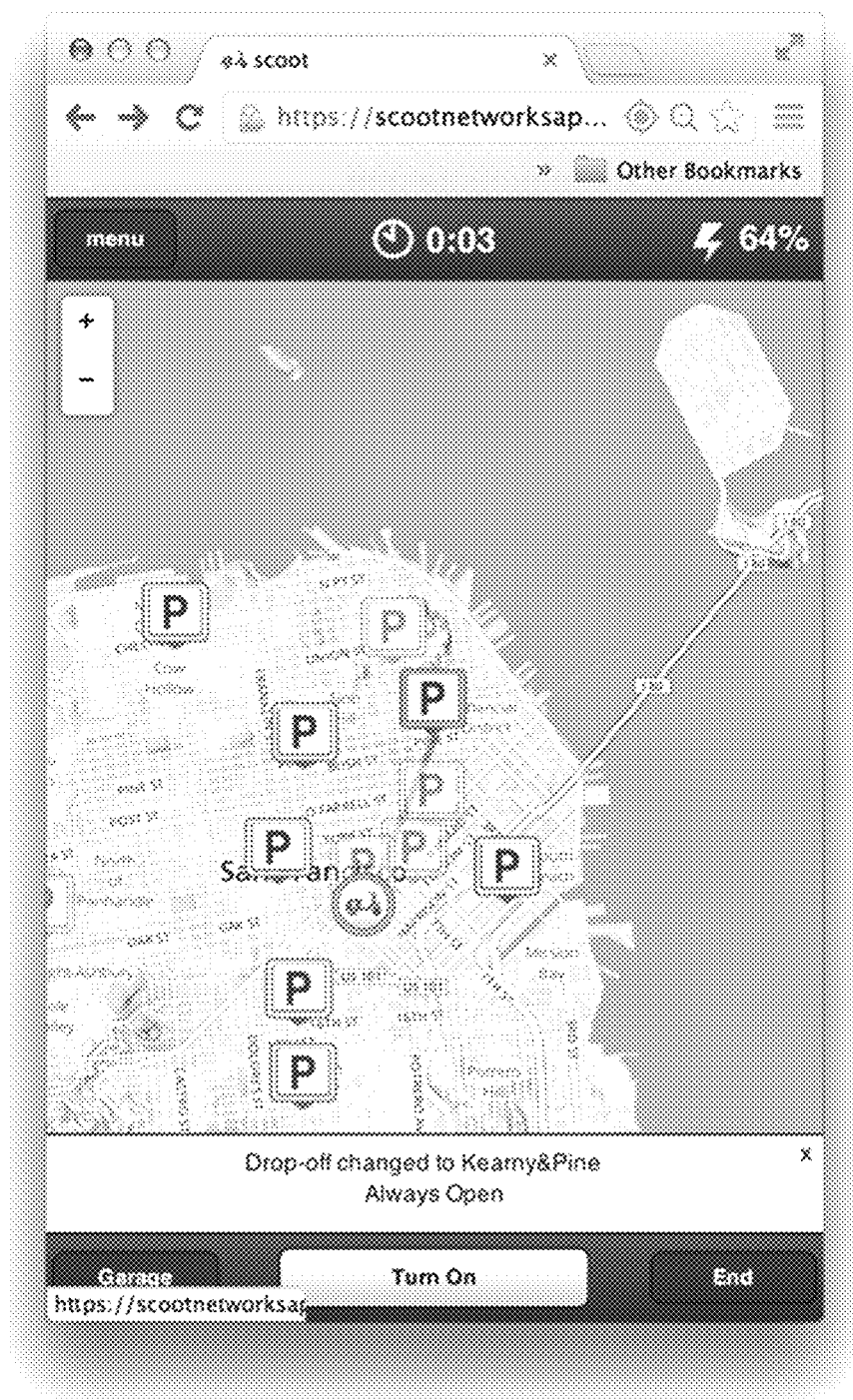
FIG. 24 is a screenshot of an app with a line that connects a current location of a scooter and a new destination location.

When a new destination (or drop-off) location is selected by the user, the app can direct the user to the new drop-off location. In FIG. 24, when a new destination garage is selected, a line (e.g., red line) is drawn connecting the current location of the scooter to the new destination location. This may help the user keep track of and find the new destination location. A message at the bottom of the screen confirms that the destination location has changed, and indicates operating hours of the new destination location. In this example, the new destination location is a garage that is "Always Open."

Systems and methods of the disclosure may be combined with or modified by other systems and methods, such as those described in U.S. Patent Publication Nos. 2007/0285209 and 2011/0112969, and Patent Cooperation Treaty Patent Publication No. WO/2001/061604, which are entirely incorporated herein by reference.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:

1. A vehicle electronic control unit, comprising:
a first communication interface configured to provide communication with a remote server;
a second communication interface configured to connect to a user electronic device; and a processor coupled to the first communication interface and the second communication interface and configured to:
- receive via the first communication interface from the remote server an indication to provide access to use of the vehicle to a user associated with the user electronic device;
- establish a connection to the user electronic device via the second communication interface; and
- unlock a locking mechanism comprising the vehicle based at least in part on the indication and the establishment of communication with the user electronic device;
- wherein the processor is configured to provide vehicle information to the remote server via communications sent to the user electronic device via the second communication interface based at least in part on an indication that communication with the remote server via the first communication interface has been lost.

2. The vehicle electronic control unit of claim 1, wherein the first communication interface comprises a cellular interface.

3. The vehicle electronic control unit of claim 1, wherein the second communication interface comprises a wireless interface.

4. The vehicle electronic control unit of claim 3, wherein the wireless interface comprises one or more of Global System for Mobile Communication (GDM), near field communication (NFC), cellular, and radiofrequency.

5. The vehicle electronic control unit of claim 1, wherein the indication comprises an access signal.

6. The vehicle electronic control unit of claim 5, wherein the server is configured to provide the access signal based at least in part on a user interaction with the server via the user electronic device.

7. The vehicle electronic control unit of claim 5, wherein the user interaction is provided via an app on the user electronic device.

8. The vehicle electronic control unit of claim 1, further comprising a Global Position System (GPS) module coupled to the processor.

9. The vehicle electronic control unit of claim 1, wherein the locking mechanism comprises a wheel lock.

10. The vehicle electronic control unit of claim 1, wherein the locking mechanism comprises a steering column lock.

11. The vehicle electronic control unit of claim 1, wherein the processor is configured to monitor a location of the vehicle.

12. The vehicle electronic control unit of claim 1, wherein the processor is configured to detect unauthorized movement of the vehicle.

13. The vehicle electronic control unit of claim 12, wherein the processor is configured to take a responsive action in response to detecting unauthorized movement of the vehicle.

14. The vehicle electronic control unit of claim 13, wherein the responsive action includes activating one or both of a visual alarm and an audible alarm on the vehicle.

15. A method to control a vehicle, comprising:
- receiving via a first communication interface from a remote server an indication to provide access to use of the vehicle to a user associated with a user electronic device;
- establishing a connection to the user electronic device via a second communication interface; and
- unlocking a locking mechanism comprising the vehicle based at least in part on the indication and the establishment of communication with the user electronic device; and
- further comprising providing vehicle information to the remote server via communications sent to the user electronic device via the second communication interface based at least in part on an indication that communication with the remote server via the first communication interface has been lost.

16. The method of claim 15, wherein the server is configured to provide the indication based at least in part on a user interaction with the server via the user electronic device.

17. The method of claim 15, wherein the locking mechanism comprises a wheel lock.

18. A non-transitory computer readable medium, comprising computer instructions for:
- receiving via a first communication interface from a remote server an indication to provide access to use of a vehicle to a user associated with a user electronic device;
- establishing a connection to the user electronic device via a second communication interface; and
- unlocking a locking mechanism comprising the vehicle based at least in part on the indication and the establishment of communication with the user electronic device and
- further comprising computer instructions for providing vehicle information to the remote server via communications sent to the user electronic device via the second communication interface based at least in part on an indication that communication with the remote server via the first communication interface has been lost.

19. The method of claim 15, wherein the locking mechanism comprises a steering column lock.

20. The method of claim 15, further comprising monitoring a location of the vehicle.

21. The method of claim 15, further comprising detecting unauthorized movement of the vehicle.

22. The method of claim 21, further comprising taking a responsive action in response to detecting unauthorized movement of the vehicle.

23. The method of claim 22, wherein the responsive action includes activating one or both of a visual alarm and an audible alarm on the vehicle.

24. The non-transitory computer readable medium of claim 18, wherein the server is configured to provide the indication based at least in part on a user interaction with the server via the user electronic device.

25. The non-transitory computer readable medium of claim 18, wherein the locking mechanism comprises a wheel lock.

* * * * *